US012587593B2

(12) United States Patent　　　(10) Patent No.:　US 12,587,593 B2
Bao et al.　　　　　　　　　　　　(45) Date of Patent:　Mar. 24, 2026

(54) DATA TRANSMISSION METHOD AND APPARATUS, DEVICE, AND STORAGE MEDIUM

(71) Applicant: Tencent Technology (Shenzhen) Company Limited, Shenzhen (CN)

(72) Inventors: Zenghui Bao, Shenzhen (CN); Yong Yuan, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 18/792,797

(22) Filed: Aug. 2, 2024

(65) Prior Publication Data

US 2024/0396984 A1　　Nov. 28, 2024

Related U.S. Application Data

(63) Continuation of application No. PCT/CN2023/127157, filed on Oct. 27, 2023.

(30) Foreign Application Priority Data

Dec. 12, 2022　(CN) .......................... 202211588437.2

(51) Int. Cl.
H04L 69/164　　(2022.01)
H04L 67/141　　(2022.01)

(52) U.S. Cl.
CPC .......... H04L 69/164 (2013.01); H04L 67/141 (2013.01)

(58) Field of Classification Search
None
See application file for complete search history.

(56) References Cited

U.S. PATENT DOCUMENTS

| | | | |
|---|---|---|---|
| 2017/0230391 A1 | 8/2017 | Ferguson et al. | |
| 2022/0091892 A1* | 3/2022 | Wang ..................... | H04L 69/02 |
| 2023/0379551 A1* | 11/2023 | Ashwathappa .. | H04N 21/64738 |

FOREIGN PATENT DOCUMENTS

| | | | |
|---|---|---|---|
| CN | 111104185 A * | 5/2020 | ......... G06F 9/44505 |
| CN | 111490963 A | 8/2020 | |

(Continued)

OTHER PUBLICATIONS

Jul. 21, 2025—Extended EP Search Report—EP Application No. 23902306.2.

(Continued)

*Primary Examiner* — Schquita D Goodwin
*Assistant Examiner* — Ishrat Rashid
(74) *Attorney, Agent, or Firm* — Banner & Witcoff, Ltd.

(57) ABSTRACT

A data transmission method is provided, where the method includes: receiving a user datagram protocol (UDP) data packet transmitted by a client; determining a target second thread from n second threads through a first thread, where the n second threads are configured for processing the UDP data packet, and the target second thread is configured for managing a QUIC connection corresponding to the UDP data packet; and transferring the UDP data packet to the target second thread through the first thread. The second threads are scheduled by the first thread, and different second threads may manage different QUIC connections, so that QUIC connections are managed through different threads. Therefore, a server can fully utilize a concurrent processing capability of a plurality of cores, which improves the efficiency of managing QUIC connections and the data transmission performance.

20 Claims, 12 Drawing Sheets

(56)　　　　　　References Cited

FOREIGN PATENT DOCUMENTS

| CN | 115334138 | A | 11/2022 | | |
|----|-----------|---|---------|---|---|
| CN | 115396528 | A | 11/2022 | | |
| CN | 115580667 | A | 1/2023 | | |
| WO | WO-2022228011 | A1 * | 11/2022 | ............. | H04L 69/22 |

OTHER PUBLICATIONS

Dec. 21, 2023—(CN) International Search Report—PCT/CN2023/127157.

* cited by examiner

UDP

Four-layer ELB                                          201

UDP

Seven-layer ELB                                        202

QUIC Server

TCP                                                    TCP

HOST          203                                      HOST          203

TCP                                                    TCP

| TCP Server | TCP Server | TCP Server | TCP Server |
|---|---|---|---|
| Media transmission module | Service gateway | Media transmission module | Service gateway |

...

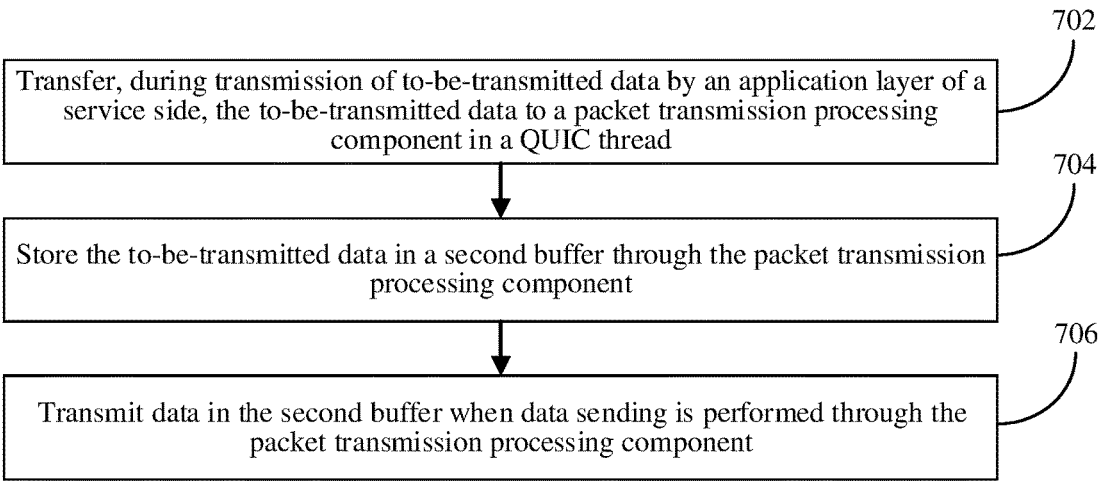

702

Transfer, during transmission of to-be-transmitted data by an application layer of a service side, the to-be-transmitted data to a packet transmission processing component in a QUIC thread

704

Store the to-be-transmitted data in a second buffer through the packet transmission processing component

706

Transmit data in the second buffer when data sending is performed through the packet transmission processing component

FIG. 7

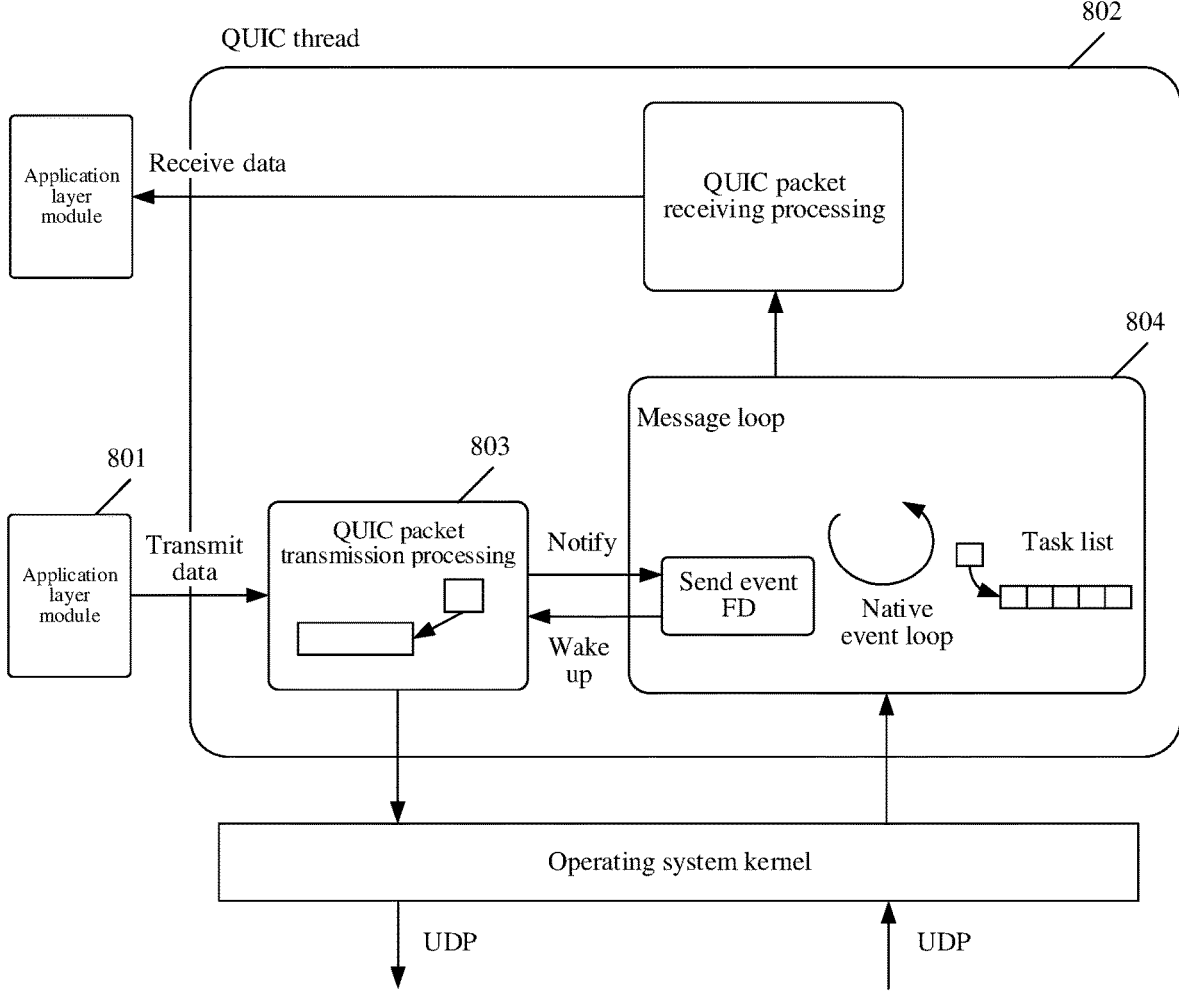

FIG. 8

Obtain a crash file through a cloud storage server in a case of receiving a crash signal transmitted by a client Determine a crash reason and position according to the crash file

1102

1202

1203

1201

1501
1503
1502
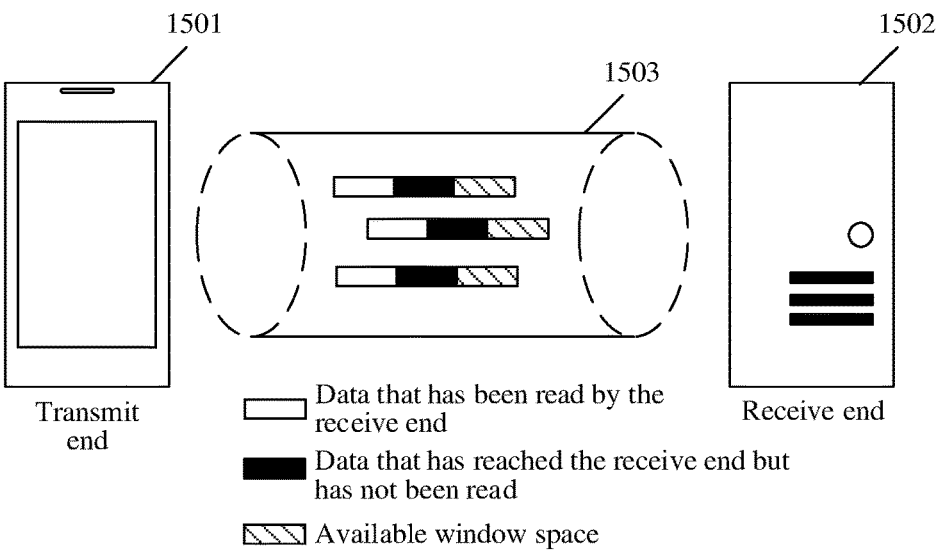
Transmit
end
▭ Data that has been read by the
receive end
■ Data that has reached the receive end but
has not been read
▨ Available window space
Receive end
FIG. 15
1602
Transmit a UDP data packet to a service side
FIG. 16
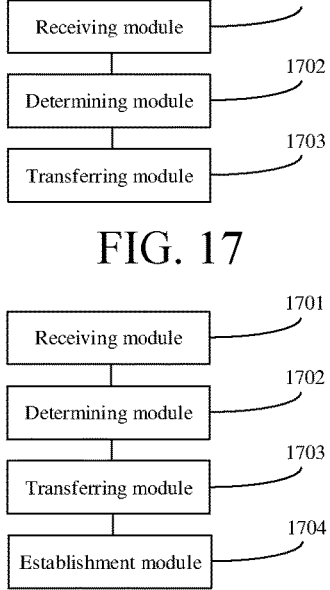
1701
Receiving module
1702
Determining module
1703
Transferring module
FIG. 17
1701
Receiving module
1702
Determining module
1703
Transferring module
1704
Establishment module
FIG. 18

| |
|---|
| Receiving module | 1701 |
| Determining module | 1702 |
| Transferring module | 1703 |
| Switching module | 1710 |

| |
|---|
| Receiving module | 1701 |
| Determining module | 1702 |
| Transferring module | 1703 |
| Storing module | 1705 |
| Uploading module | 1711 |

Transmitting module — 2501

| |
|---|
| Transmitting module | 2501 |
| Transferring module | 2502 |
| Storing module | 2503 |

DATA TRANSMISSION METHOD AND APPARATUS, DEVICE, AND STORAGE MEDIUM

RELATED APPLICATION

This application is a continuation application of PCT Application PCT/CN2023/127157, filed Oct. 27, 2023, which claims priority to Chinese Patent Application No. 202211588437.2 filed on Dec. 12, 2022, each entitled "DATA TRANSMISSION METHOD AND APPARATUS, DEVICE, AND STORAGE MEDIUM", and each of which is incorporated herein by reference in its entirety.

FIELD OF THE TECHNOLOGY

This application relates to the field of communication, and in particular, to a data transmission method and apparatus, a device, and a storage medium.

BACKGROUND OF THE DISCLOSURE

Cloud gaming is a gaming mode based on cloud computing. In a cloud gaming mode, a server is configured to run a game, compress a rendered game screen, and then transmit the compressed rendered game screen to a client, and the client is configured to transmit an operation event of a user to the server to control running of the game. This process involves frequent data transmission, and therefore has a very high requirement on a transmission delay.

A quick user datagram protocol Internet connection (QUIC) protocol is a protocol using the user datagram protocol (UDP) for multi-channel concurrent transmission, and has many advantages over the transmission control protocol (TCP). In the related art, data transmission is generally implemented using the QUIC protocol, for example, a gQUIC protocol (a type of QUIC protocol), to improve the data transmission performance.

In a case that a QUIC library (including code for implement the gQUIC protocol) corresponding to the gQUIC protocol is used, a plurality of cores of a central processing unit (CPU) cannot be fully utilized to manage QUIC connections, leading to a low efficiency.

SUMMARY

This disclosure provides a data transmission method and apparatus, a device, and a storage medium, which can improve the efficiency of managing QUIC connections. The technical solutions are as follows.

According to an aspect of this disclosure, a data transmission method is provided, where the method may be performed by a server, a communication connection being established between a service side running in the server and a client, the server and the client being integrated with a quick user datagram protocol Internet connection-software development kit (QUIC-SDK), the QUIC-SDK being configured to implement QUIC protocol-based transmission, and the method including the following operations:

receiving a user datagram protocol (UDP) data packet transmitted by the client;

determining a target second thread from n second threads through a first thread, the n second threads being configured for processing the UDP data packet, the target second thread being configured for managing a QUIC connection corresponding to the UDP data packet, the first thread and the second threads being provided by the QUIC-SDK, and n being an integer greater than 1; and transferring the UDP data packet to the target second thread through the first thread.

According to an aspect of this disclosure, a data transmission method is provided, where the method may be performed by a client, a communication connection being established between the client and a service side running in a server, the service side and the client being integrated with a quick user datagram protocol Internet connection-software development kit (QUIC-SDK), the QUIC-SDK being configured to implement QUIC protocol-based transmission, and the method including the following operations:

transmitting a user datagram protocol (UDP) data packet to the server, the server being configured to determine a target second thread from n second threads through a first thread, and transmit the UDP data packet to the target second thread through the first thread, the n second threads being configured for processing the UDP data packet, the target second thread being configured for managing a QUIC connection corresponding to the UDP data packet, the first thread and the second threads being provided by the QUIC-SDK, and n being an integer greater than 1.

According to another aspect of this disclosure, a data transmission apparatus is provided, a communication connection being established between a service side running in the apparatus and a client, the service side and the client being integrated with a quick user datagram protocol Internet connection-software development kit (QUIC-SDK), the QUIC-SDK being configured to implement QUIC protocol-based transmission, and the apparatus including the following modules:

a receiving module, configured to receive a user datagram protocol (UDP) data packet transmitted by the client;

a determining module, configured to determine a target second thread from n second threads through a first thread, the n second threads being configured for processing the UDP data packet, the target second thread being configured for managing a QUIC connection corresponding to the UDP data packet, the first thread and the second threads being provided by the QUIC-SDK, and n being an integer greater than 1; and a transferring module, configured to transfer the UDP data packet to the target second thread through the first thread.

According to another aspect of this disclosure, a data transmission apparatus is provided, a communication connection being established between the apparatus and a service side running in a server, the server and the apparatus being integrated with a quick user datagram protocol Internet connection-software development kit (QUIC-SDK), the QUIC-SDK being configured to implement QUIC protocol-based transmission, and the apparatus including the following modules:

a transmitting module, configured to transmit a user datagram protocol (UDP) data packet to the server, the server being configured to determine a target second thread from n second threads through a first thread, and transmit the UDP data packet to the target second thread through the first thread, the n second threads being configured for processing the UDP data packet, the target second thread being configured for managing a QUIC connection corresponding to the UDP data packet, the first thread and the second threads being provided by the QUIC-SDK, and n being an integer greater than 1.

According to another aspect of this disclosure, a computer device is provided, including a processor and a memory, the memory having at least one instruction stored therein, at least one program, and a code set or an instruction set, and the at least one instruction, the at least one program, and the code set or the instruction set being loaded and executed by the processor to implement the data transmission method according to the foregoing aspects.

According to another aspect of this disclosure, a computer-readable storage medium is provided, the computer-readable storage medium storing at least one instruction, at least one program, and a code set or an instruction set, and the at least one instruction, the at least one program, and the code set or the instruction set being loaded and executed by a processor to implement the data transmission method according to the foregoing aspects.

According to another aspect of this disclosure, a computer program product or a computer program is provided, the computer program product or the computer program including computer instructions, and the computer instructions being stored in a computer-readable storage medium. A processor of a computer device reads the computer instructions from the computer-readable storage medium and executes the computer instructions, to cause the computer device to perform the data transmission method provided in various implementations of the foregoing aspects.

The technical solutions provided in this disclosure have at least the following beneficial effects:

The second threads are scheduled by the first thread, and different second threads may manage different QUIC connections, so that QUIC connections are managed through the different second threads. Therefore, a server can fully utilize a concurrent processing capability of a plurality of cores, thereby avoiding a problem of a great limitation on a bottleneck of a concurrent amount caused when a single thread is used to manage QUIC connections, improving the efficiency of managing QUIC connections, and helping improve the data transmission performance.

BRIEF DESCRIPTION OF THE DRAWINGS

FIG. 7 is a schematic flowchart of still another data transmission method according to an illustrative aspect of this disclosure.

FIG. 8 is a schematic diagram of a data transmitting process according to an illustrative aspect of this disclosure.

FIG. 15 is a schematic diagram of a traffic control principle according to an illustrative aspect of this disclosure.

FIG. 16 is a schematic flowchart of a data transmission method according to an illustrative aspect of this disclosure.

FIG. 17 is a schematic structural diagram of a first data transmission apparatus according to an illustrative aspect of this disclosure.

FIG. 18 is a schematic structural diagram of a second data transmission apparatus according to an illustrative aspect of this disclosure.

DETAILED DESCRIPTION

Figures 1, 2:
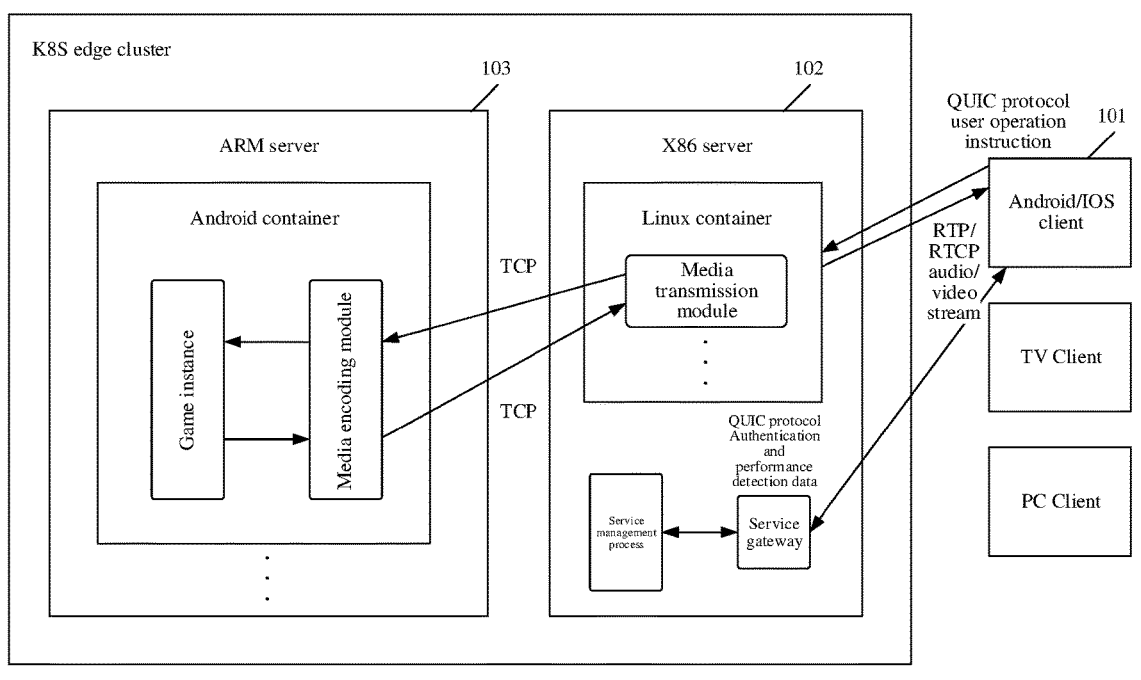
FIG. 1 is a schematic diagram of backend deployment of a cloud gaming service according to an illustrative aspect of this disclosure.
FIG. 2 is a schematic diagram of a deployment solution based on a QUIC protocol in the related art according to an illustrative aspect of this disclosure.

First, terms involved in the illustrative aspects of this disclosure are introduced.

Cloud gaming: Cloud gaming is a gaming mode based on cloud computing. In a running mode of cloud gaming, all games are run at a server, and the server compresses a rendered game screen and then transmits the compressed rendered game screen to a client (user) through a network. The client obtains an operation event of the user, such as a touch screen event, a keyboard mouse event, or a joystick event, and transmits the operation event to the server through the network, to achieve an objective of operating a game.

QUIC protocol: QUIC is a homonym of the English word "quick", which is referred to as "fast". The QUIC protocol is a protocol using a user datagram protocol (UDP) for multiple-channel concurrent transmission, and has many advantages over a transmission control protocol (TCP).

IETF QUIC: A QUIC protocol specification provided by the Internet Engineering Task Force (IETF) standard organization.

gQUIC: The gQUIC protocol is a QUIC protocol, which is intended to be designed as a universal protocol to support a Hypertext Transfer Protocol Secure (HTTP(S)/HTTPS) in a browser, also follows up to support the latest QUIC standard, and has some format differences from the IETF QUIC.

WebRTC: The WebRTC is an abbreviation for World Wide Web (WEB) Real-Time Communication (RTC), and is both an application programming interface (API) and a protocol. The WebRTC is a cross-platform audio and video communication framework, and has become an IETF Web standard.

Pacing: It means moving with rhythm and pace. In the audio and video field, pacing is used to describe that an action is performed at a fixed frequency.

Congestion control: A mechanism acting on a network, which prevents excessive data from being injected into the network and avoids a situation in which a network load is excessively large.

Traffic control: It refers to that if a transmitter transmits data too fast and a receiver has no time to receive the data, there is packet loss. To avoid packet loss, a transmission speed of the transmitter needs to be controlled so that the receiver has time to receive the data.

Cloud object storage (COS): It refers to a distributed storage service without a directory hierarchical structure and data format restriction, that can accommodate massive data and support Hypertext Transfer Protocol (HTTP)/HTTPS access, and may be specifically implemented as a cloud storage server.

Promethues: An open-source detection alert solution, which has been widely applied to a Kubernetes (K8S, a container cluster management system) cloud native environment.

PushGateway: A component provided for a target that has a short lifetime or cannot be pulled.

Grafana: An open-source data visualization tool developed by using a Go language (Golang, a development language) is mainly used to detect data visualization and issue an alert.

In a cloud gaming scenario, a user is very sensitive to an operation delay of the user, and a magnitude of the delay mainly depends on a network status of a client. A network of the client has an unstable characteristic, for example, there is a case of network switching (switching between wireless fidelity (Wi-Fi) and 4th generation (4G) mobile communication technology/5th generation (5G) mobile communication technology, or frequent switching of base stations in a mobile scenario (on a subway train)) and a case of weak networks (network jitter and packet loss). It is difficult for a conventional TCP and a TCP-based full-duplex communication protocol (WebSocket) to cope with such situations.

According to the method provided in the embodiments of this disclosure, a communication connection based on a QUIC protocol may be established between a client and a server. Compared with the conventional TCP and Web-Socket, a delay can be reduced, thereby optimizing the user experience under a weak network. For example, the method provided in the aspects of this disclosure can be applied to a cloud gaming scenario. FIG. 1 is a schematic diagram of backend deployment of a cloud gaming service according to an illustrative aspect of this disclosure. As shown in FIG. 1, a client 101 may establish a QUIC protocol-based communication connection to an X86 (an architecture) server 102 in a K8S edge cluster, and the X86 server 102 in the K8S edge cluster establishes a TCP-based communication connection to an ARM (an architecture) server 103. A user operation instruction transmitted by the client 101 to a media transmission module in a Linux (an operating system) container of the X86 server 102 may be transmitted by using the QUIC protocol, an audio/video stream of a cloud game transmitted by the media transmission module in the X86 server 102 to the client 101 may be transmitted by using a real-time transport protocol (RTP) or a real-time transport control protocol (RTCP), and authentication and performance detection data transmitted between the client 101 and the X86 server 102 may be transmitted by using the QUIC protocol. Data transmission between the X86 server 102 in the K8S edge cluster and a media encoding module in an Android (an operating system) container of the ARM server 103 may be performed by using the TCP. The media encoding module may be configured to encode media data of the cloud game. A game instance in the Android container of the ARM server 103 may be a running cloud game. The backend deployment solution of the cloud gaming service may be merely used as an example and is not intended to limit this disclosure.

The cloud gaming service has the following particularities.

(1) A requirement on a delay is extremely high.

(2) There are many edge clusters, maintenance costs need to be reduced as much as possible, and resource costs of a single cluster needs to be reduced.

When an implementation solution is selected, some trade-offs need to be made. In addition, the quality of QUIC libraries in the open-source field varies greatly, and a lot of work is required to make appropriate selection and modify the libraries to adapt to the architecture of cloud gaming. The aspects of this disclosure provide a solution for applying the QUIC protocol to a cloud gaming service, which can meet the requirement of a low delay without increasing the maintenance costs and without increasing the resource costs of a single cluster.

For example, FIG. 2 is a schematic diagram of a deployment solution based on a QUIC protocol in the related art according to an illustrative aspect of this disclosure. As shown in FIG. 2, after a UDP data packet outside a server passes through a four-layer elastic load balance (ELB) proxy 201 and a seven-layer ELB proxy 202, the UDP data packet may be transmitted to a service process in a backend (a host 203). A process of transmission of the UDP data packet to the host 203 may be performed by using the TCP, and transmission of the UDP data packet after the host 203 may be performed by using the TCP. The seven-layer ELB proxy 202 implements a QUIC Server, that is, a service implemented based on the QUIC protocol.

The foregoing solution in the related art has the following disadvantages.

(1) The seven-layer ELB proxy requires exclusive machines, that is, under this deployment solution, 2 ELB proxies are required to be deployed separately in each edge cluster. Because cloud gaming has a large number of edge clusters, this greatly increases machine costs and deployment and maintenance costs.

(2) A transmission delay is increased. Since one hop (the seven-layer ELB proxy) is added to a transmission link, and the seven-layer ELB proxy is a QUIC Server implemented at an application layer, context switching from a kernel to the application layer is increased. In an actual test, a delay of 0.5 milliseconds is added by this hop.

(3) The ELB proxy is added, which changes a route forwarding rule the host.

According to the method provided in the aspects of this disclosure, a QUIC-SDK for implementing QUIC protocol-based transmission can be integrated in the server and the client to implement QUIC protocol-based transmission. Compared with the foregoing solution, there is no need to separately deploy an ELB proxy for implementing a QUIC Server, which can save machine costs and deployment and maintenance costs. In addition, because there is no need to deploy an ELB proxy for implementing a QUIC Server, the foregoing transmission delay can be avoided, and maintenance complexity caused by a change of a forwarding rule can be avoided.

Figure 3:
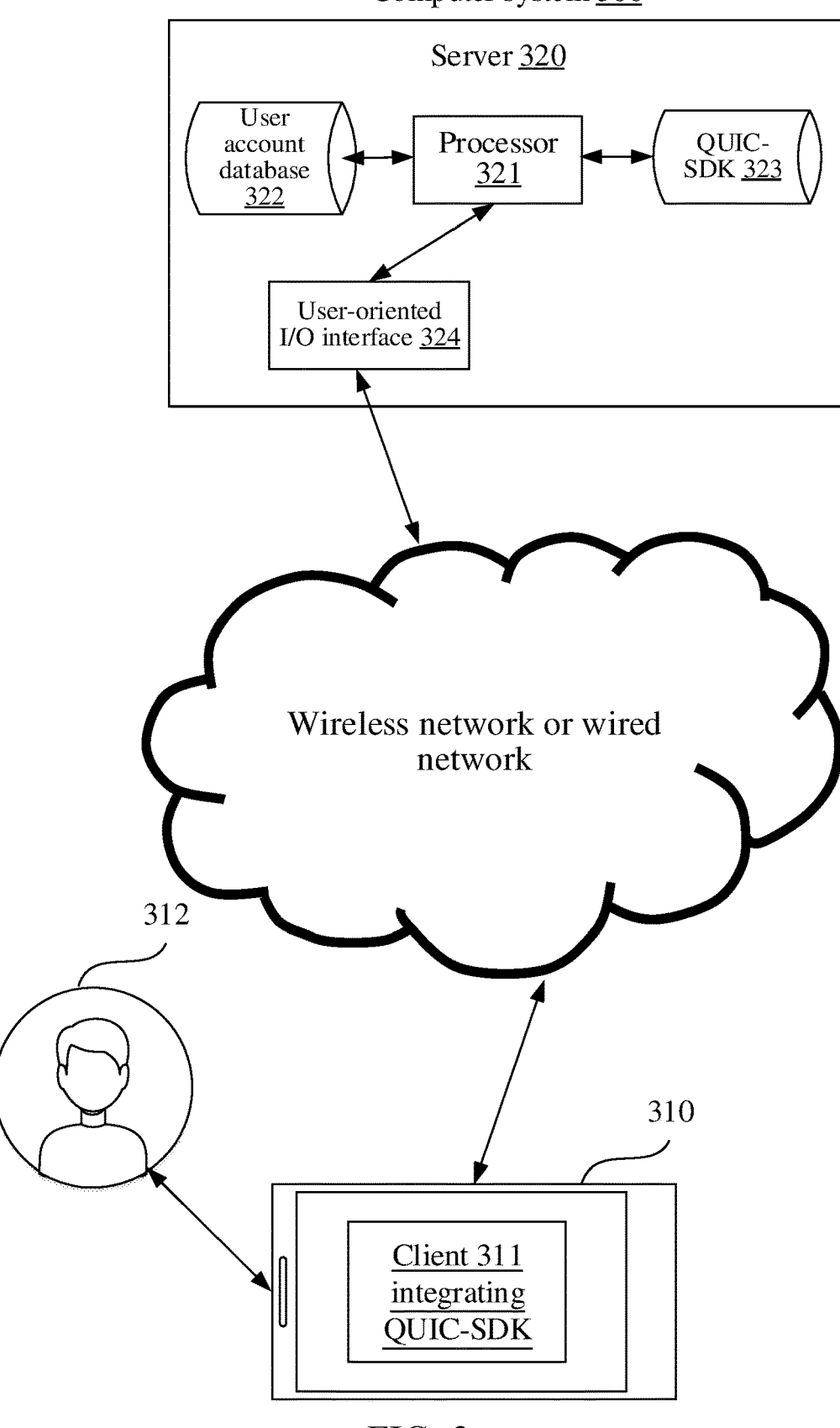
FIG. 3 is a structural block diagram of a computer system according to an illustrative aspect of this disclosure.

FIG. 3 is a structural block diagram of a computer system according to an exemplary aspect of this disclosure. The computer system 300 includes a terminal 310 and a server 320.

A client 311 supporting cloud gaming may be installed and run on the terminal 310. When the terminal 310 may invoke the client 311 to run, a user interface of the client 311 may be displayed on a screen of the terminal 310. The client 311 may have a QUIC-SDK integrated therein, and the QUIC-SDK may be configured to implement QUIC protocol-based transmission. The terminal 310 may be a terminal used by a user 312, and a user account of the user 312 may log in to the client 311. The terminal 310 may generally refer to one of a plurality of terminals. In some aspects, a device type of the terminal 310 includes at least one of a smartphone, a tablet computer, an E-book reader, an MP3 player, an MP4 player, a laptop portable computer, or a desktop computer.

The terminal 310 may be connected to a service side running in the server 320 through a wireless network or a wired network.

The server 320 includes at least one of a server, a plurality of servers, a cloud computing platform, or a virtualization center. The server 320 may be configured to provide a backend service to the client 311 supporting cloud gaming. In some aspects, the server 320 may be responsible for primary computing work, and the terminal 310 may be responsible for secondary computing work. Alternatively, the server 320 may be responsible for secondary computing work, and the terminal 310 may be responsible for primary computing work. Alternatively, a distributed computing architecture may be used between the server 320 and the terminal 310 to perform collaborative computing.

In an illustrative example, the server 320 may include a processor 321, a user account database 322, a QUIC-SDK 323, and a user-oriented input/output interface (I/O interface) 324. The processor 321 may be configured to load instructions stored in the server 320, and process data in the user account database 322 and the QUIC-SDK 323. The user account database 322 may be configured for storing data of user accounts used by the terminal 310 and other terminals, such as avatars of the user accounts, nicknames of the user accounts, and groups in which the user accounts are located. The QUIC-SDK 323 may be configured to implement QUIC protocol-based transmission. The user-oriented I/O interface 324 may be configured to establish communication and exchange data with the terminal 310 through a wireless network or a wired network.

When a QUIC library (for implementing the QUIC-SDK) may be selected, the following requirements are proposed: (1) The QUIC library can follow up with the QUIC standard and may be continuously updated; (2) the QUIC library may be mature and stable; (3) the QUIC library may support cross-platform; and (4) the QUIC library may support a server and a client, and support a persistent connection. Currently, there is no mature and out-of-the-box QUIC library in the open-source field. In summary, the gQUIC library has high code quality, can continuously follow up with the standard, and can well support cross-platform, but has the following disadvantages.

(1) The gQUIC library may be difficult to integrate, and it depends on many components of a browser, so that it may be difficult to separate the gQUIC library from the components.

(2) Only HTTP (QUIC-based) transmission may be implemented, and a persistent connection might not be supported.

(3) The gQUIC library may be unfriendly to the server, does not support high concurrency, and has poor performance and delay.

The aspects of this disclosure provide a solution for applying the QUIC protocol to a cloud gaming scenario. This solution has advantages of a low transmission delay, does not increase the maintenance costs, and does not increase the resource costs of a single cluster, and may be very suitable for an edge computing scenario requiring a low delay. The QUIC-SDK may be provided (for example, provided through a game matrix SDK), to establish QUIC protocol-based transmission between all types of clients and the server. The solution may be used to reduce an operation delay of cloud gaming and improve the stability of a persistent connection in a weak network scenario.

Figure 4:
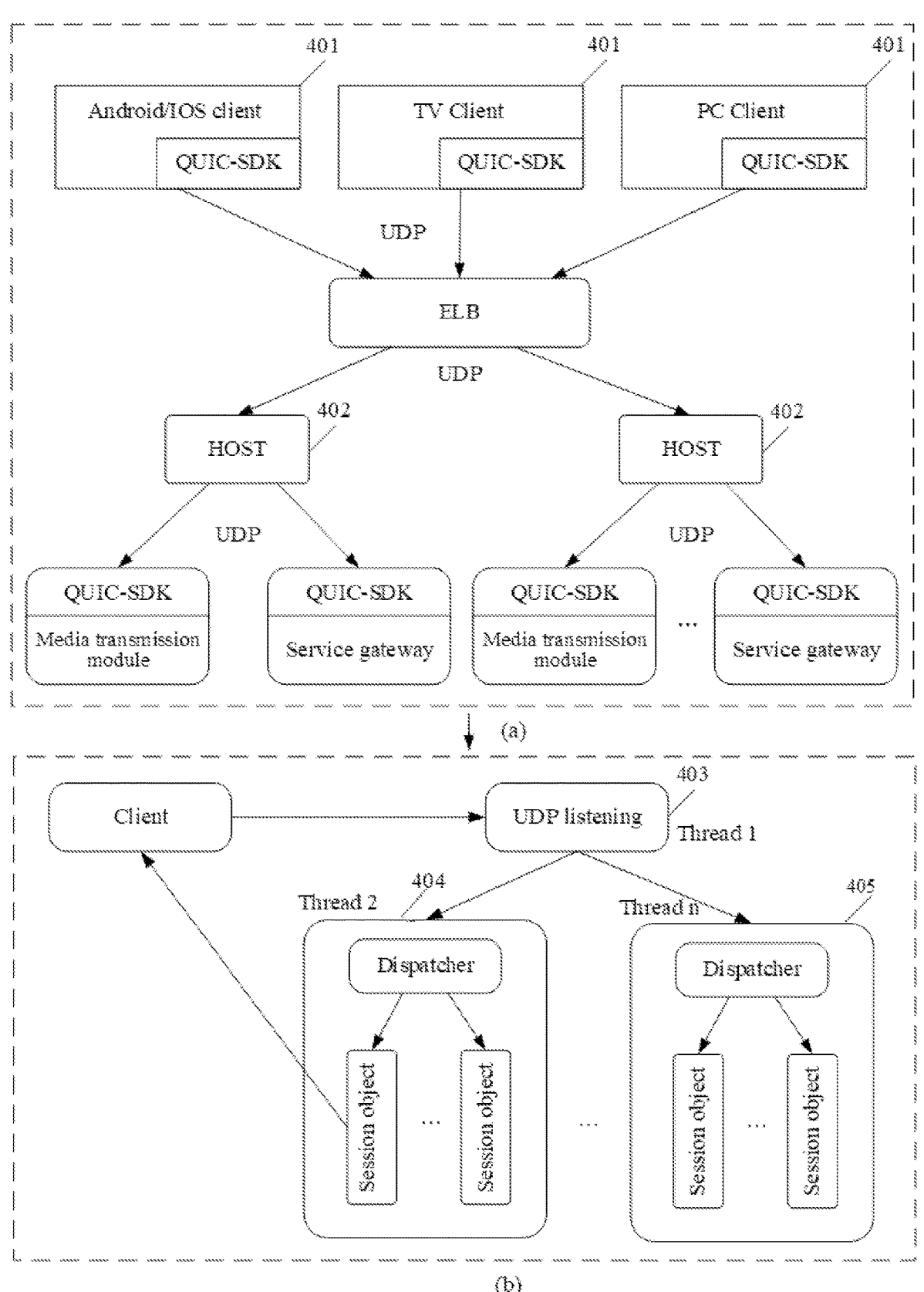
FIG. 4 is a schematic diagram of an architecture mode of cloud gaming based on a QUIC protocol according to an illustrative aspect of this disclosure.

For example, FIG. 4 is a schematic diagram of an architecture mode of cloud gaming based on a QUIC protocol according to an illustrative aspect of this disclosure. As shown in part (a) of FIG. 4, in this architecture, the cloud gaming may include a client 401 and a server (host) 402. In some aspects, an elastic load balance (ELB), for example, a four-layer ELB may be deployed between the client 401 and the server 402. The client 401 may integrate the QUIC-SDK, and each application layer module of the server 402 may integrate the QUIC-SDK, to provide a QUIC server for each application layer module of the server 402, that is, provide QUIC protocol-based transmission for each application layer module, where the QUIC-SDK may be configured to implement QUIC protocol-based transmission. The QUIC-SDK may be integrated in the client and the server. This solution may have advantages of not adding an additional transmission delay, not increasing machine costs and maintenance costs, and may have good compatibility with a backend deployment architecture.

For an integration manner, in some aspects, the QUIC-SDK in this aspect of this application may be obtained by optimizing a gQUIC library of gQUIC. During integration of the QUIC-SDK based on the gQUIC library of the gQUIC, there are three solutions: (1) A full gQUIC library may be used, and service code of the cloud gaming may be added to construct a service module; (2) code of the gQUIC library may be extracted as a new library, and then the new library may be placed into an actual project for use; and (3) Optimization modification may be performed on a full gQUIC library, to encapsulate the full gQUIC library into a new library, and then the new library may be used in an actual project. The integration solution in this disclosure may be the foregoing solution (3), which has advantages of moderate work, low maintenance costs, and a capability of being updated following the gQUIC library. The foregoing solution may be described by using an example in which a gQUIC library may be integrated. The solution provided in this disclosure can also use the foregoing solutions to integrate another QUIC library. The foregoing description of a gQUIC library integration process is not used as a limitation on this disclosure. In some aspects, a specific integration solution includes the following solutions.

For the server: Based on a C++ language (a development language), the QUIC-SDK may be compiled into a shared library, and the server performs link reference on the shared library. Based on a Go language (a development language), a native QUIC (QUIC NATIVE) may be encapsulated through a CGO tool (making the Go language and a C language to invoke each other) into a QUIC-SDK of the Go layer.

For the client: For an Android client, QUIC NATIVE code may be encapsulated through a Java (a development language) native interface (JNI) layer into a QUIC-SDK of the Java layer. For a Hypertext Markup Language 5 (H5) end and a Web end, the QUIC-SDK may be compiled into a Wasm (that is, a Web assembly) by using a Web assembly technology, and then loaded into a browser.

In the foregoing integration solution, a shared library may be used instead of a static library. A library may be a binary form of executable code, and can be loaded into an internal memory by an operating system for execution. Code of a static library may be been loaded into an executable program in a compilation process, while code of a shared library may be loaded into the internal memory when the executable program runs. The code of the shard library may be simply referred to in the compilation process. The shared library may be used because there are a large number of symbols (for linking related code) in the gQUIC, and the static library may be prone to symbol conflict, resulting in an incapability to compile. A benefit of using the shared library may be that there may be no need to integrate QUIC-related code into program code, and therefore there may be no symbol conflict. The integrated QUIC-SDK may further implement a persistent connection function.

Optimization for data reception: Since the server of the gQUIC library cannot utilize an expansion capability of a plurality of CPU cores, a bottleneck of a concurrent amount of the server may be greatly limited. As shown in part (b) of FIG. 4, in this aspect of this disclosure, when receiving a UDP data packet transmitted by the client 401, the server 402 may parse the UDP data packet through a first thread 403 to obtain a target connection identifier (connection ID), and determines, through the first thread 403 according to a first buffer (buffer map), whether a QUIC connection corresponding to the target connection identifier may be an existing connection. In a case that the QUIC connection corresponding to the target connection identifier is an existing connection, the server 402 may determines, through the first thread 403 according to the first buffer, a second thread 404 including a session object (QUIC session) corresponding to the target connection identifier as a target second thread, where the session object corresponds to the QUIC connection. Then, the first thread 403 may transfer the UDP data packet to a dispatcher in the target second thread, the dispatcher in the target second thread may determine the session object corresponding to the connection identifier, and then the dispatcher in the target second thread may transfer the UDP data packet to the session object corresponding to the connection identifier, to process the UDP data packet. In a case that the QUIC connection corresponding to the connection identifier is not an existing connection, the server 402 may determine a target second thread from n second threads 405 randomly through the first thread 403, and transfer the UDP data packet to a dispatcher in the target second thread through the first thread 403. Then the server may establish a QUIC connection of the UDP data packet, create a session object corresponding to the QUIC connection in the target second thread, and then transfer the UDP data packet to the session object corresponding to the QUIC connection through the dispatcher in the target second thread, to process the UDP data packet. Through the foregoing solution, reception of the UDP data packet may be completed, and subsequent processing may be implemented through the session object.

For data sending: During transmission of to-be-transmitted data by an application layer (an application layer module) of the server 402, the to-be-transmitted data may be transferred to a packet transmission processing component in a QUIC thread, and the to-be-transmitted data may be stored in a second buffer (local send buffer) through the packet transmission processing component. Then, when data sending is performed through the packet transmission processing component, the server 402 may transmit data in the second buffer. In this process, the server 402 may transmit a wakeup notification to a message loop through the packet transmission processing component based on a send event file descriptor (FD), where the message loop may be configured for managing a transmission task. The message loop may then wake up the packet transmission processing component to instruct the packet transmission processing component to perform data sending. The foregoing data sending solution can also be applied to the client 401, that is, the client 401 may also performs the foregoing data sending procedure through the QUIC-SDK.

For crash analysis: In a case of receiving a crash signal transmitted by the client 401, the server 402 may obtain a crash file through a cloud storage server (for example, COS), to determine a crash reason and position according to the crash file. The crash file may be generated and uploaded to the cloud storage server by the client 401 in a case of monitoring a running crash through the QUIC-SDK. In a case of receiving the crash signal transmitted by the client 401, the client 401 and the server 402 may switch an application layer protocol to a stream control transmission protocol (SCTP) or WebSocket.

For performance detection: During operation of the server, the server 402 may format and store performance detection data in a local file. Then, when the server 402 ends service, the local file may be uploaded to the cloud storage server. The local file in the cloud storage server may be parsed to obtain performance detection information, and the performance detection information may be displayed in a user interface, for example, displayed in a browser.

By integrating the QUIC-SDK in the server and the client, QUIC protocol-based transmission may be implemented, which can improve the data transmission performance. In addition, the second threads may be scheduled by the first thread, and different second threads may manage different QUIC connections, so that QUIC connections are managed through different threads. Therefore, the server can fully utilize a concurrent processing capability of a plurality of cores, thereby avoiding a problem of a great limitation on a bottleneck of a concurrent amount caused when a single thread may be used to manage QUIC connections, improving the efficiency of managing QUIC connections, and helping improve the data transmission performance.

Figures 5, 6:
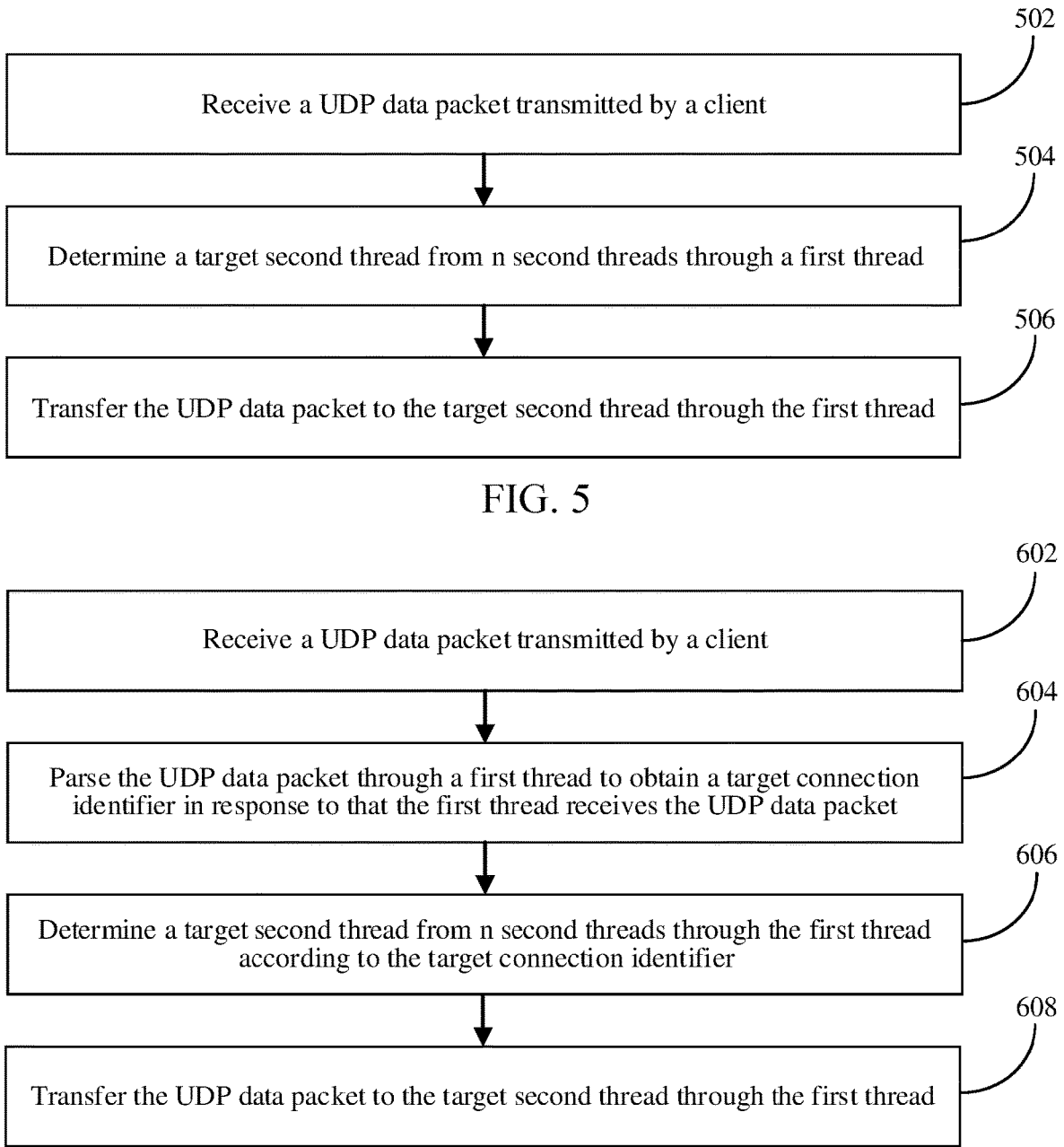
FIG. 5 is a schematic flowchart of a data transmission method according to an illustrative aspect of this disclosure.
FIG. 6 is a schematic flowchart of another data transmission method according to an illustrative aspect of this disclosure.

FIG. 5 is a schematic flowchart of a data transmission method according to an exemplary aspect of this disclosure. The method may be applied to a server. As shown in FIG. 5, the method may include the following operations.

Operation 502. Receive a user datagram protocol (UDP) data packet transmitted by a client.

A communication connection may be established between a server running in the server and the client, the server and the client are integrated with a quick user datagram protocol Internet connection-software development kit (QUIC-SDK), and the QUIC-SDK may be configured to implement QUIC protocol-based transmission. That the server receives the UDP data packet may refer to that an application layer module in the server receives the UDP data packet, for example, a media transmission module or a service gateway receives the UDP data packet, and a process of receiving the UDP data packet may be implemented based on the QUIC-SDK.

For example, the UDP data packet may include an operation instruction of a user of a cloud game to operate the cloud game, or include data configured for authentication, or includes performance detection data.

Operation 504. Determine a target second thread from n second threads through a first thread.

n may be an integer greater than 1. The first thread and the second threads may be provided by the QUIC-SDK. Components provided by the QUIC-SDK run in different threads of the server, so that the first thread and the second threads are provided. The n second threads may be configured for processing the UDP data packet. Different second threads may manage different QUIC connections, and each second thread can manage one or more QUIC connections. The target second thread may be a second thread determined by the first thread and configured for managing a QUIC connection corresponding to the UDP data packet. In some aspects, the QUIC connection may be a persistent connection.

The first thread may be configured for receiving the UDP data packet. After receiving the UDP data packet, the first thread determines whether the QUIC connection corresponding to the UDP data packet is an existing connection. In a case that the QUIC connection corresponding to the UDP data packet is an existing connection, the first thread may determine a second thread managing the existing connection as the target second thread. In a case that the QUIC connection corresponding to the UDP data packet is not an existing connection, the first thread may determine the target second thread from the n second threads in sequence, or determine the target second thread randomly according to a quantity of QUIC connections managed by each second thread. The server may establish a corresponding QUIC connection in the target second thread for the UDP data packet. In this case, the target second thread may become a thread for managing the QUIC connection of the UDP data packet.

Operation 506. Transfer the UDP data packet to the target second thread through the first thread.

The target second thread may be configured for managing the QUIC connection of the UDP data packet. Through the QUIC connection, the UDP data packet can be parsed, processed, and transmitted. In some aspects, each thread in the second threads may include a dispatcher, the dispatcher may be configured to manage one or more session objects, and each session object may correspond to an established QUIC connection to be responsible for managing the QUIC connection, to process a UDP data packet corresponding to the QUIC connection. When transferring the UDP data packet to the target second thread, the first thread may transfer the UDP data packet to the dispatcher of the target second thread. The dispatcher of the target second thread may transfer, according to a correspondence between the QUIC connection of the UDP data packet and the session object, the UDP data packet to the session object corresponding to the QUIC connection of the UDP data packet, to implement processing of the UDP data packet.

Based on the above, according to the method provided in this aspect, the second threads may be scheduled by the first thread, and different second threads may manage different QUIC connections, so that QUIC connections are managed through different threads. Therefore, the server can fully utilize a concurrent processing capability of a plurality of cores, thereby avoiding a problem of a great limitation on a bottleneck of a concurrent amount caused when a single thread may be used to manage QUIC connections, improving the efficiency of managing QUIC connections, and helping improve the data transmission performance.

The following aspect describes an optimization solution for data reception.

FIG. 6 is a schematic flowchart of another data transmission method according to an exemplary aspect of this disclosure. The method may be applied to a server. As shown in FIG. 6, the method may include the following operations.

Operation 602. Receive a user datagram protocol (UDP) data packet transmitted by a client.

A communication connection may be established between a server running in the server and the client, the server and the client are integrated with a quick user datagram protocol Internet connection-software development kit (QUIC-SDK), and the QUIC-SDK may be configured to implement QUIC protocol-based transmission. In some aspects, the server performs UDP listening through a first thread to receive the UDP data packet transmitted by the client. The first thread may also be referred to as a main thread, and the first thread may be provided by the QUIC-SDK.

The server may separately use one thread for listening, and for listening, the server may use a separate UDP file descriptor (FD). A process of implementing listening through the first thread: The server may create a UDP FD, set a reuse rule, for example, including reuse addr and reuse port attributes, for the UDP FD, and then bind a listening address, so that the first thread invokes a receiving function (recvfrom ( )) to receive the UDP data packet. The foregoing reuse rule may be configured for causing different threads to bind the same listening address for the UDP data packet. The listening address may point to a transmitting address of the client, and may be configured for listening to a data packet transmitted by the client, so that the server may learn that a UDP data packet received by the server may be transmitted by the client, so as to perform subsequent processing. The foregoing processing is not performed on a data packet transmitted from a non-listening address.

Operation 604. Parse the UDP data packet through a first thread to obtain a target connection identifier in response to that the first thread receives the UDP data packet.

The target connection identifier (connection ID) may be configured for identifying a QUIC connection corresponding to the UDP data packet. Different second threads in the server may manage different QUIC connections, and each second thread can manage one or more QUIC connections. A second thread configured for managing the QUIC connection of the UDP data packet may be determined through the first thread according to the target connection identifier obtained through parsing. The second threads may be provided by the QUIC-SDK.

Operation 606. Determine a target second thread from n second threads through the first thread according to the target connection identifier.

The target second thread may be a second thread determined by the first thread and configured for managing the QUIC connection corresponding to the UDP data packet, and n is an integer greater than 1. The second thread may also be referred to as a subthread. In some aspects, the QUIC connection may be a persistent connection. There may be a correspondence between QUIC connections managed by different second threads and connection identifiers, and through the first thread, the target second thread configured for managing the QUIC connection of the UDP data packet may be determined according to the target connection identifier. By parsing the connection identifier to determine the second thread, a manner for maintaining a correspondence between the thread and the QUIC connection may be provided, so that the target second thread can be quickly determined.

In a case of obtaining the target connection identifier of the UDP data packet through parsing, the first thread queries whether the QUIC connection corresponding to the target connection identifier may be an existing connection, that is, queries whether the QUIC connection corresponding to the target connection identifier may be a new connection (not connected) or an old connection (connected).

For a case that the QUIC connection corresponding to the target connection identifier is not an existing connection:

The server may determine the target second thread from the n second threads randomly through the first thread in a case that the QUIC connection corresponding to the target connection identifier is not an existing connection. By determining the target second thread randomly in a case of determining that the QUIC connection of the UDP data packet is not an existing connection according to a first buffer in combination with a connection identifier, a manner of scheduling the second thread in a case that a connection is not established is provided.

For a case that the QUIC connection corresponding to the target connection identifier is an existing connection:

The server may determine, through the first thread, a second thread configured for managing the QUIC connection corresponding to the target connection identifier as the target second thread according to a first buffer in a case that the QUIC connection corresponding to the target connection identifier may be an existing connection. For example, the first buffer may be implemented based on a map (a key-value pair set interface) in a development language, and may be referred to as a buffer map. The map provides a universal element storage method. A set class implemented based on the map may be configured for storing an element pair (that is, a "key" and a "value"), where each key may be mapped to a value. In some aspects, the server may determine, through the first thread, a second thread including a session object (QuicSession) corresponding to the target connection identifier as the target second thread according to the first buffer. The first buffer may be configured for storing a correspondence between session objects in different second threads and connection identifiers, and each session object corresponds to a QUIC connection and may be responsible for managing the corresponding QUIC connection. By determining whether the QUIC connection of the UDP data packet may be an existing connection according to the first buffer in combination with the connection identifier to determine the target second thread according to the first buffer, a manner of quickly selecting a subthread in a case that a QUIC connection may be established may be provided.

Operation 608. Transfer the UDP data packet to the target second thread through the first thread.

In some aspects, each thread in the n second threads includes a dispatcher, the dispatcher may be configured to manage one or more session objects, and each session object corresponds to a QUIC connection. The server may transfer the UDP data packet to the dispatcher in the target second thread through the first thread. After receiving the UDP data packet, the dispatcher in the target second thread may also parse out the target connection identifier and determines whether the QUIC connection may be an existing connection.

For a case that the QUIC connection corresponding to the target connection identifier is an existing connection:

The server may determine, through the dispatcher in the target second thread, the session object corresponding to the target connection identifier according to the first buffer, and then transfer, through the dispatcher in the target second thread, the UDP data packet to the session object corresponding to the target connection identifier (the session object may be responsible for the QUIC connection corresponding to the target connection identifier), to process the UDP data packet. By scheduling the QUIC connection session object through the dispatcher in each subthread, each subthread can support a plurality of QUIC connections, thereby improving the efficiency of managing QUIC connections.

For a case that the QUIC connection corresponding to the target connection identifier is not an existing connection:

The server may transfer the UDP data packet to the dispatcher in the target second thread through the first thread, establish the QUIC connection of the UDP data packet in a case that the dispatcher in the target second thread determines that the QUIC connection corresponding to the target connection identifier is not an existing connection, and create a session object corresponding to the QUIC connection of the UDP data packet in the target second thread. Then, the dispatcher in the target second thread may transfer the UDP data packet to the session object corresponding to the QUIC connection of the UDP data packet.

In some aspects, in the foregoing process, the server may create a new UDP FD, set a reuse rule, for example, including reuse addr and reuse port attributes, for the UDP FD, and then bind a listening address. The reuse rule may be configured for the first thread and the second threads to bind the same listening address for the UDP data packet. Then, the server may use a connection function (connect (peer_addr)) for the UDP FD, to connect the UDP FD to a peer address (peer_addr). When the session object is created, the servers may create the session object (a connection object, for example, including a QUIC session (QuicSession), a QUIC connection (QuicConnection), a QUIC reader (QuicReader), and a QUIC writer (QuicWriter)) corresponding to the QUIC connection of the UDP data packet in the target second thread based on the UDP FD, to register a read/write event. Then, a read/write operation of the UDP FD may be processed in the QuicSession. The UDP FD may be provided with a reuse rule, and the reuse rule may be configured for the first thread and the second threads to bind the same listening address for the UDP data packet. The server may further store a correspondence between the session object in the target second thread and the target connection identifier in the first buffer.

By storing the correspondence between the session object and the connection identifier in the first buffer, the correspondence between the QUIC connection and the second thread can be quickly determined through the first buffer. By creating the QUIC connection of the UDP data packet in the target second thread and creating the corresponding session object, QUIC connections are managed, so that a specific implementation process of establishing a QUIC connection not established and scheduling the UDP data packet may be provided.

A reuse rule (reuse addr and reuse port attributes) may be set for both the UDP FD of the main thread and the UDP FD of the subthread. If the reuse rule is not set, binding the main thread and the subthread to the same listening address on Linux may fail. By setting the reuse rule for the UDP FD, address conflict caused by binding different UDP FDs to the same address and listening failure can be prevented. When creating a new connection, the subthread needs to execute connect (peer_addr) on the UDP FD. A benefit of this practice may be that: By making a mapping (that is, mapping from peer_addr to a thread) in a Linux kernel, when a data packet from the peer_addr may be received subsequently, the server can preferentially wake up the corresponding thread, and then dispatch the UDP data packet to the thread, to improve the efficiency. After the server supports the foregoing multi-thread model, each QUIC connection corresponds to a UDP FD in one subthread. The server may use a send function (send ( )) and a receive function (recv ( )) to replace a sendto function (sendto (peer-addr)) and a receive-from function (recvfrom (src_addr)). In this way, there may be no need to perform kernel addressing during data transmitting and receiving. Therefore, a process of one kernel addressing may be reduced, to reduce a delay.

Based on the above, according to the method provided in this disclosure, the second threads may be scheduled by the first thread, and different second threads may manage different QUIC connections, so that QUIC connections are managed through different threads. Therefore, the server can fully utilize a concurrent processing capability of a plurality of cores, thereby avoiding a problem of a great limitation on a bottleneck of a concurrent amount caused when a single thread may be used to manage QUIC connections, improving the efficiency of managing QUIC connections, and helping improve the data transmission performance.

The following aspect describes an optimization solution for data sending.

FIG. 7 is a schematic flowchart of still another data transmission method according to an exemplary aspect of this disclosure. The method may be applied to a server. As shown in FIG. 7, the method may include the following operations.

Operation 702. Transfer, during transmission of to-be-transmitted data by an application layer of a server, the to-be-transmitted data to a packet transmission processing component in a QUIC thread.

A communication connection may be established between the server running in the server and a client, the server and the client are integrated with a quick user datagram protocol Internet connection-software development kit (QUIC-SDK), and the QUIC-SDK may be configured to implement QUIC protocol-based transmission. The QUIC thread may be a thread provided by the QUIC-SDK. The QUIC thread has a function provided by the QUIC-SDK, and components in the QUIC thread are provided by the QUIC-SDK. The application layer of the server may transmit the to-be-transmitted data, that is, an application layer module of the server may transmit the to-be-transmitted data.

Operation 704. Store the to-be-transmitted data in a second buffer through the packet transmission processing component.

When the packet transmission processing component receives the to-be-transmitted data, the server may store the to-be-transmitted data in the second buffer (local send buffer). Data stored in the second buffer may be data for subsequent transmission, and the second buffer may be a local buffer of the server.

Operation 706. Transmit data in the second buffer when data sending may be performed through the packet transmission processing component.

In some aspects, when data sending may be performed through the packet transmission processing component, the server may take out all to-be-transmitted data in the second buffer and performs batch packaging, to transmit all the data in the second buffer. By transmitting all the data in the second buffer at one time, compared with transmitting the data one by one according to a queue, the data can be transmitted in batches, thereby improving the data sending efficiency.

A data sending task may be managed by a message loop component. The message loop may be also referred to as a message cycle. The message loop may be a programming structure that waits for and dispatches messages, and may be a foundation of a message driving mechanism. The message loop component can cause all tasks (for example, tasks of transmitting data) to be asynchronously driven. The message loop component may be configured to receive tasks to generate a task list, and trigger to execute the tasks in the task list in a loop manner. In some aspects, during transmission of the to-be-transmitted data, the server may transmit a wakeup notification to the message loop component through the packet transmission processing component based on a send event file descriptor (SendEventFD) of the message loop component, where the message loop may be configured for managing a transmission task. Then, the server wakes up the packet transmission processing component through the message loop component, to instruct the packet transmission processing component to perform data sending, so as to transmit the data through the packet transmission processing component.

In a gQUIC library, a process of data sending may be that an application layer transfers data to the gQUIC library, and a message loop component in a QUIC thread may create an asynchronous task. Then, the message loop component may wake up the QUIC thread according to execution of a task list. A packet transmission processing component in the QUIC thread may extract the asynchronous task. Then, the packet transmission processing component may execute a packet transmission processing task, and transmit a final packet to an operating system kernel, to complete data sending.

In the method provided in this aspect of this disclosure, the packet transmission processing component may obtain the data transmitted by the application layer, and the message loop component may be notified through the send event file descriptor, so that the message loop wakes up the packet transmission processing component for data sending. Compared with the foregoing gQUIC solution, the message loop component can be actively woken up to execute the data transmission task without waiting for an indication of the message loop component, thereby simplifying a procedure from delivering a transmission task to executing the transmission task, and improving the data sending efficiency.

In this aspect of this disclosure, notification of an internal event may be performed by using an EventFD (that is, SendEventFD) instead of a pipe file descriptor (PipeFD). Both the EventFD and the PipeFD are configured for event notification. For example, for the operating system kernel, overhead of the EventFD may be lower, and only one virtual file needs to be created for the EventFD, while two virtual files need to be created for the PipeFD. In addition, the EventFD may be used in a multiplexing model, thereby implementing an asynchronous signal notification function. Therefore, compared with the PipeFD, use of the EventFD can improve the notification efficiency.

In addition, in this aspect of this disclosure, a quantity of messages processed in one loop may be further improved. For example, in the gQUIC library, in a case that there are two data transmission tasks, when the message loop component notifies the packet transmission processing component to transmit the tasks, it may be considered by default that the packet transmission processing component may be notified to execute only one data transmission task each time. For the two data transmission tasks, the packet transmission processing component needs to be notified twice, and the packet transmission processing component needs to wait for a next notification after executing one data transmission task. In the method provided in this aspect of this disclosure, since data of different transmission tasks may be stored in the second buffer, it may be possible to enable the message loop component to instruct, in one notification performed by the packet transmission processing component, the packet transmission processing component to execute a plurality of transmission tasks, that is, to transmit data of the plurality of tasks, so that the packet transmission processing component can perform batch packaging and transmit the data of the plurality of transmission tasks in the second buffer, thereby improving a throughput of data transmission.

For example, FIG. 8 is a schematic diagram of a data transmitting process according to an exemplary aspect of this disclosure. As shown in FIG. 8, when an application layer module 801 of a server transmits data, the data may be transferred to a QUIC library (a QUIC thread 802), and a QUIC packet transmission processing component 803 may store the data in a second buffer (a local send buffer), and notify (Notify ( )) a SendEventFD of a message loop component 804 to wake up the message loop component. The message loop component 804 may establish a corresponding transmission task (PostTask ( )) in a task list for the send event, and execute tasks in the task list according to a native event loop, to wake up (Wakeup ( )) the QUIC packet transmission processing component 803 and instruct the QUIC packet transmission processing component 803 to perform data sending. The QUIC packet transmission processing component 803 may extract all to-be-transmitted data from the second buffer (local send buffer), perform batch packaging on the data, and transmit the data to an operating system kernel, thereby completing transmission of the data. The operating system kernel may be configured to transmit data to a receiving end of the data. For example, the operating system kernel may be a Linux kernel. For example, after obtaining the data that needs to be transmitted, the operating system kernel may convert the data into data packets, and invoke a network adapter driver of a server to enable the network adapter to obtain the data that needs to be transmitted and instruct the network adapter to transmit the data, so that the network adapter of the server transmits the obtained data to a receiving end of the data.

Based on the above, according to the method provided in this aspect, in a process of transmitting data, the transmitted data may be first stored in the local second buffer and then transmitted, so that memory overhead can be reduced compared with a solution in which the transmitted data may be copied and then transmitted.

The following aspect describes an optimization solution for crash analysis.

Figure 9:
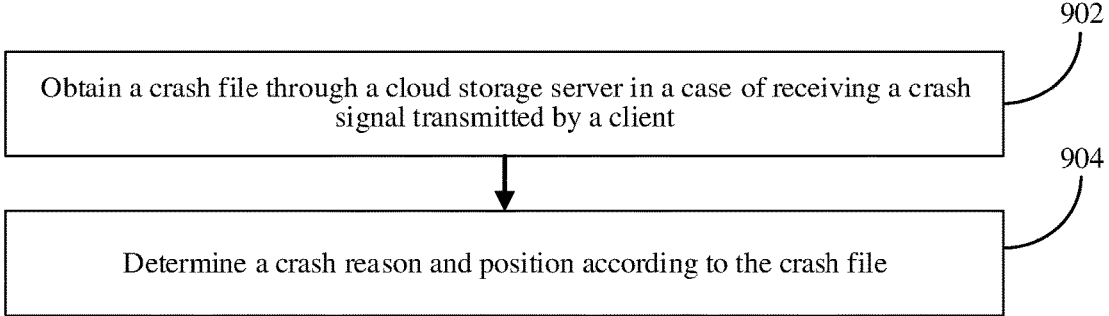
FIG. 9 is a schematic flowchart of yet another data transmission method according to an illustrative aspect of this disclosure.

FIG. 9 is a schematic flowchart of yet another data transmission method according to an exemplary aspect of this disclosure. The method may be applied to a server. As shown in FIG. 9, the method may include the following operations.

Operation 902. Obtain a crash file through a cloud storage server in a case of receiving a crash signal transmitted by a client.

A communication connection may be established between a server running in the server and the client, the server and the client are integrated with a quick user datagram protocol Internet connection-software development kit (QUIC-SDK), and the QUIC-SDK may be configured to implement QUIC protocol-based transmission. The crash file may be generated and uploaded to the cloud storage server by the client in a case of monitoring a running crash through the QUIC-SDK. In some aspects, the cloud storage server may be cloud object storage (COS). The server listens to the crash signal through the QUIC-SDK.

In some aspects, the crash file may be a minidump. When the client executes a crash, a minidump during the crash may be generated. In this case, the client uploads the minidump to the COS and notifies the server. In some aspects, the crash signal includes at least one of information indicating that a QUIC crashes and a file path of the minidump in the COS.

In a case of receiving the crash signal transmitted by the client, the client and the server may switch an application layer protocol. For example, the application layer protocol may be switched from a QUIC protocol implemented by the QUIC-SDK to a stream control transmission protocol (SCTP) or a full-duplex communication protocol (Web-Socket). The SCTP may be a protocol that simultaneously transmits a plurality of data streams between two ends of a network connection. The WebSocket may be a protocol that performs full-duplex communication over a single transmission control protocol (TCP) connection. The SCTP and the WebSocket are connection-based, and the QUIC protocol implemented by the QUIC-SDK may be based on a user datagram protocol (UDP), where the UDP may be non-connection-based. Data transmission based on a connection may be stable and reliable, and may be suitable for a scenario with a high network communication quality requirement where data needs to be accurately transmitted to another party. The UDP may have an advantage of fast speed, but may generate packet loss. Therefore, the UDP may be suitable for a scenario in which there may be a high requirement on real-time performance but there may be no much requirement on a small amount of packet loss. In the method provided in this aspect, by switching the application layer protocol in a case of a system crash, switching to a stable protocol after the crash can be implemented to ensure quality of service.

For example, the application layer may be a seventh layer under an open system interconnection (OSI) model. The OSI model divides work of network communication into seven layers, which are respectively a physical layer, a data link layer, a network layer, a transport layer, a session layer, a presentation layer, and an application layer.

Operation 904. Determine a crash reason and position according to the crash file.

The crash file may be generated and uploaded to the cloud storage server by the client in a case of monitoring a running crash through the QUIC-SDK. In some aspects, the QUIC-SDK (QUIC library) in this aspect of this disclosure integrates a Breakpad library to detect a crash during running. When the QUIC library may be constructed, the server dumps symbol information in code and stores the symbol information as a symbol file. When the QUIC library may be distributed to the outside, a QUIC library with the symbol information removed may be distributed, thereby reducing a size of a library file and reducing leakage of the symbol information.

After obtaining the crash file, the server may locate the crash reason and position according to the symbol file stored during construction of the QUIC library, thereby analyzing the crash.

Figure 10:
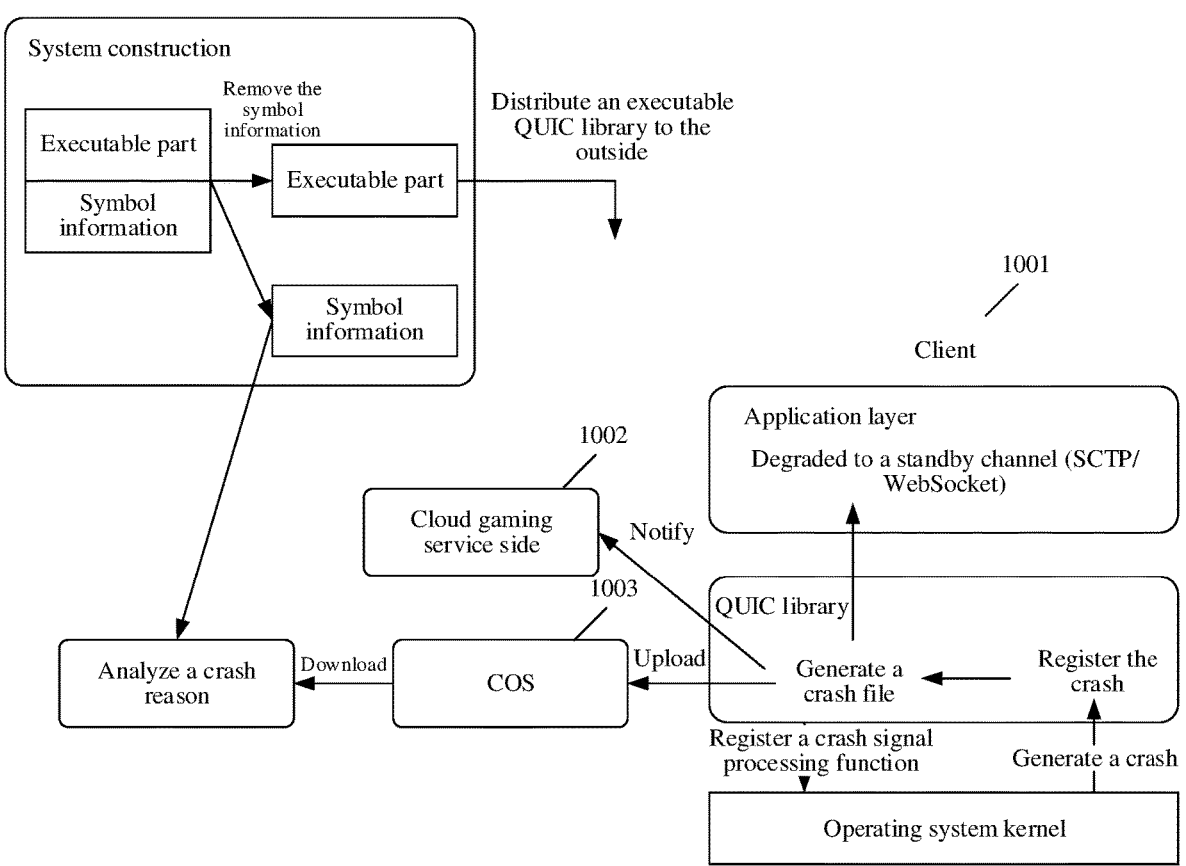
FIG. 10 is a schematic diagram of a crash analysis process according to an illustrative aspect of this disclosure.

For example, FIG. 10 is a schematic diagram of a crash analysis process according to an exemplary aspect of this disclosure. As shown in FIG. 10, a client 1001 may register a crash signal processing function (CrashHandler ( )) provided by a QUIC library (provided by a QUIC-SDK) with an operating system kernel, and then the client 1001 may detect a running crash of the operating system kernel through the crash signal processing function. In a case that a running crash is detected, the client 1001 may generate a crash file and uploads the crash file to a COS 1003, and the client 1001 may further transmit a crash signal to a cloud gaming service side 1002. When a crash is detected, the client 1001 may further degrade an application layer to a standby channel (SCTP or WebSocket). The cloud gaming service side 1002 may download the crash file through the COS 1003, and analyze a crash reason and position according to a symbol file stored during construction of a system in combination with the crash file.

Based on the above, according to the method provided in this aspect, the server may obtain the crash file generated by the client in a crash case to analyze the crash case, which provides a simple and convenient implementation solution for analyzing the crash case of the system. In addition, the crash file may be transmitted through the cloud storage server, which can ensure the transmission stability and facilitate history recording of crashes.

The following aspect describes an optimization solution for performance detection.

Figure 11:
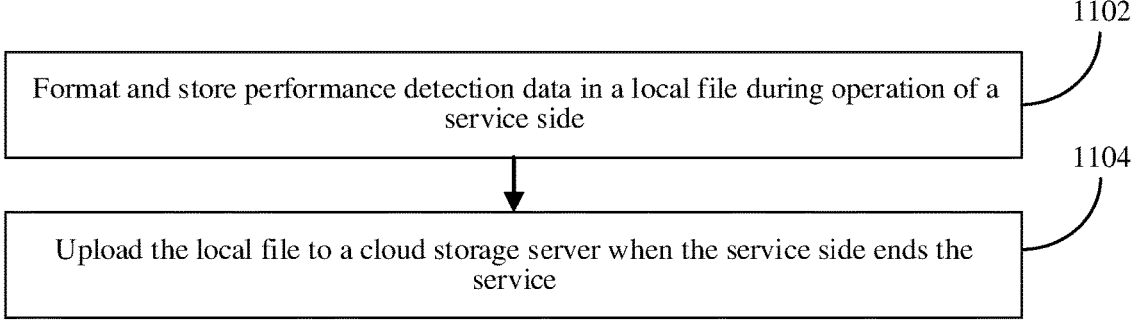
FIG. 11 is a schematic flowchart of yet another data transmission method according to an illustrative aspect of this disclosure.

FIG. 11 is a schematic flowchart of yet another data transmission method according to an exemplary aspect of this disclosure. The method may be applied to a server. As shown in FIG. 11, the method may include the following operations.

Operation 1102. Format and store performance detection data in a local file during operation of a service side.

The operation of the server may indicate that the server provides a backend service for a client. For example, a user uses the client to play a cloud game, and the server runs the cloud game in this process. By performing formatting processing on the performance detection data, subsequent analysis can be facilitated. For example, the formatting processing refers to converting any type of data into a character string through a format operation, that is, processing the data in a format convenient for reading and analysis, so that a format of data obtained through the processing meets a requirement of reading and analysis, thereby improving the efficiency of subsequent reading and analysis. In some aspects, a format used for the foregoing formatting processing may be set by a developer. In some aspects, the performance detection data includes data reflecting QUIC protocol-based transmission performance, such as a quantity of packets received and transmitted and a receiving/transmitting speed based on a QUIC protocol. For example, a QUIC protocol-based transmitting speed of unprocessed data may be "10000000000" kb (binary) per second, and a QUIC protocol-based transmitting speed of data obtained after the formatting processing may be "1024" kb (decimal) per second.

Operation 1104. Upload the local file to a cloud storage server when the server ends the service.

That the server may end the service refers to that the server stops providing the backend service for the client. For example, the user exits the client, and the server stops running the cloud game in this process. The local file in the cloud storage server may be parsed to obtain performance detection information. The performance detection information may be information that can be intuitively displayed to a user, and the performance detection information may be displayed in a user interface.

Figure 12:
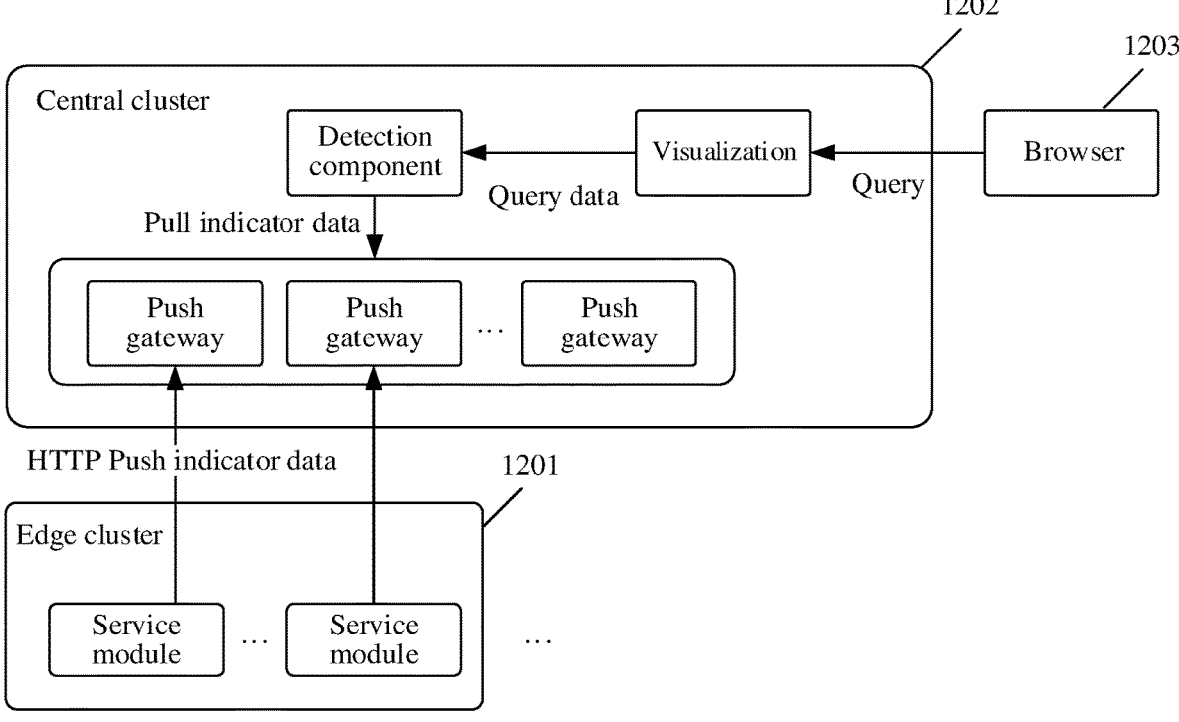
FIG. 12 is a schematic diagram of a process of performing performance detection in the related art according to an illustrative aspect of this disclosure.

For example, FIG. 12 is a schematic diagram of a process of performing performance detection in the related art according to an exemplary aspect of this disclosure. As shown in FIG. 12, a service module of an edge cluster 1201 pushes detection data to a detection server 1202 in a background by using a Prometheus-SDK method, to collect and store indicator data in the background. Then, the detection data may be queried and displayed in a browser 1203 by using Grafana. Disadvantages of the foregoing solution include a high requirement on a concurrent amount of a backend service (such as a storage service Prometheus and a receiving gateway PushGateway) and high machine costs. However, for detection, a daily query frequency may be low, and using a large number of machines to implement the foregoing solution has a low resource utilization efficiency.

Figures 13, 14:
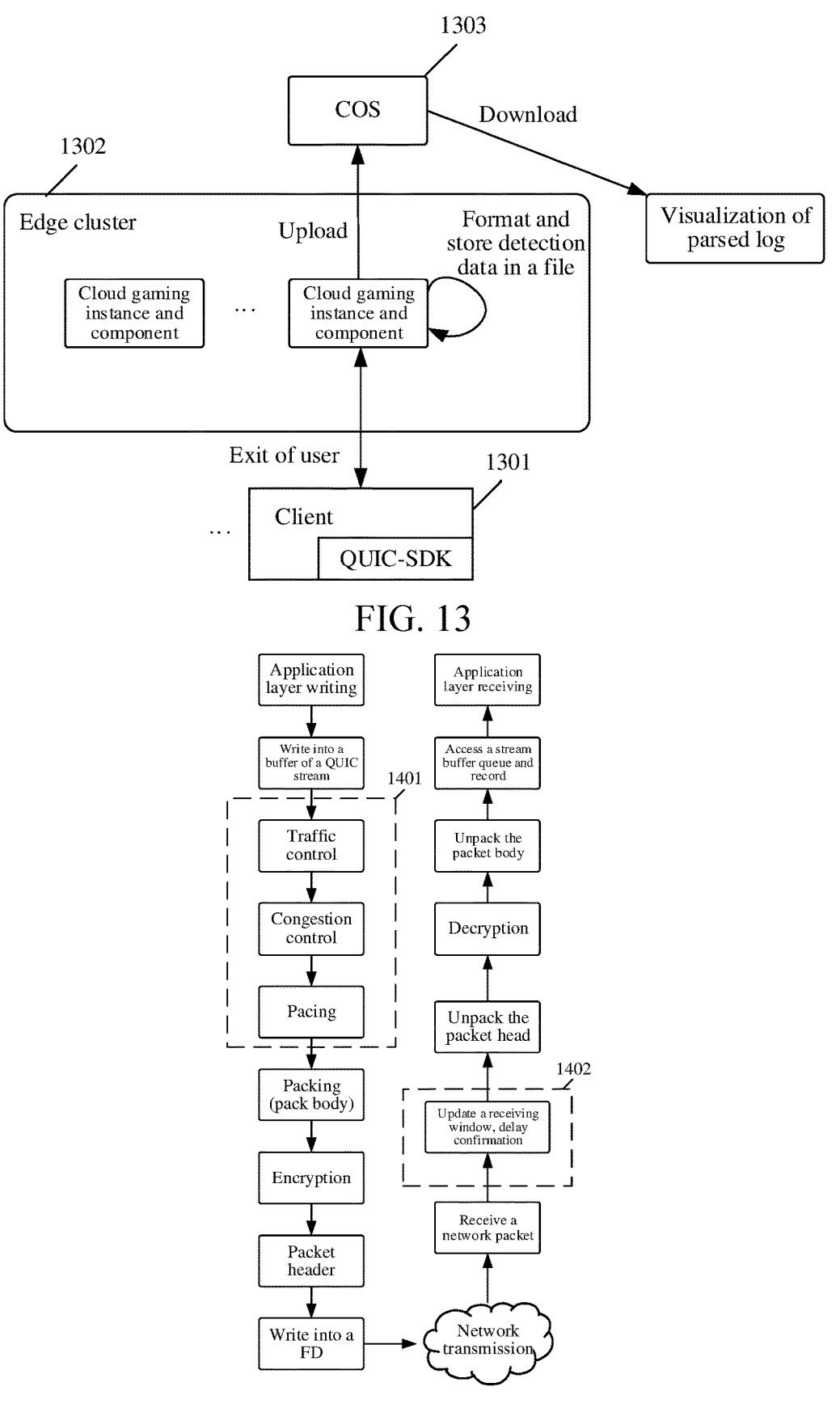
FIG. 13 is a schematic diagram of a performance detection process according to an illustrative aspect of this disclosure.
FIG. 14 is a schematic diagram of a transmission process based on a QUIC protocol according to an illustrative aspect of this disclosure.

For example, FIG. 13 is a schematic diagram of a performance detection process according to an exemplary aspect of this disclosure. As shown in FIG. 13, in this solution provided in this aspect of this disclosure, during program running of an edge cluster 1302, the edge cluster 1302 may format and store detection data in a local file. When a user exits a client 1301, the edge cluster 1302 may upload a log file to a COS 1303. When the detection data is queried subsequently, by downloading the log file and then parsing the log file, the detection data can be intuitively displayed on a Web interface.

Based on the above, according to the method provided in this aspect, during operation of the edge cluster or server, the performance detection data may be stored and uploaded when the service may be ended, which realizes lightweight performance detection. In addition, the performance detection data can be conveniently obtained through a cloud storage server for analysis and display, thereby reducing overhead of performing performance detection on the server.

For a receiving/transmitting delay of QUIC protocol-based transmission, the aspects of this disclosure also provide an optimization solution for this delay. FIG. 14 is a schematic diagram of a transmission process based on a QUIC protocol according to an exemplary aspect of this disclosure. As shown in FIG. 14, there may be traffic control, congestion control, and a Pacing link 1401 in a transmit end to limit a transmitting speed, to reduce a congestion degree for a peer end and a network. After receiving a data packet, a receive end may perform a delay confirmation process 1402 to confirm whether a current reception window is sufficient. If the current reception window is insufficient, the receive end may transmit a delay confirmation to the transmit end, and notify the peer end to reduce the transmitting speed. The optimization solution provided in this aspect of this disclosure includes the following links.

For traffic control: For example, FIG. 15 is a schematic diagram of a traffic control principle according to an exemplary aspect of this disclosure. As shown in FIG. 15, a QUIC connection 1503 may be established between a transmit end 1501 and a receive end 1502. Under a QUIC protocol, there may be two levels of traffic control. The two levels of traffic control may be respectively: a Connection level and a Stream level. The Connection level may be to perform overall traffic control on a QUIC connection, while the Stream level may be to perform traffic control on each request in the QUIC connection to reduce mutual impact of streams. This has a benefit of supporting setting different window sizes for each connection and each stream at an application layer. In addition, for data packets received out of order (different time sequences), a receiving window (reflecting a size of flowable traffic) can still slide toward a later time. If the size of the transmission window of the transmit end is set excessively small, a transmitting speed may be affected. For example, if the window does not meet a transmitting requirement, the transmit end buffers data, and waits for recovery of the transmitting window, that is, transmits the data after the transmitting requirement is met. If the size of the receiving window of the receive end is set excessively small, when an amount of received data exceeds the window size, a delay confirmation is transmitted to the transmit end, indicating that the receive end has no room to receive the data. In this way, the transmit end does not continuously transmit the data, and the transmit end waits until the receive end has a sufficient receiving window and then transmits the data.

Compared with a gQUIC library, in the QUIC-SDK provided in this aspect of this disclosure, the size of the transmitting window of the transmit end may be increased and the size of the receiving window of the receive end may be increased. The adjustment process may involve both the Connection level and the Stream level. To be specific, the adjustment may include increasing a Stream window size and a Connection window size of the transmit end and the receive end respectively. Adjusted values may be determined based on an actual situation of received and transmitted packets, and can also be determined based on empirical values.

For congestion control: The transmit end can detect a real-time bandwidth size in a network link in real time through a detection algorithm in congestion control. The detected real-time bandwidth size may limit the transmitting speed of the transmit end, so that global network congestion can be avoided. For example, through the detection algorithm, the transmit end can periodically detect a bandwidth size of the network, and alternately measure a maximum bandwidth value and a minimum delay value within a period of time. Then, the transmit end may determine a size of a congestion window based on a product of the two values. A reason for performing measurement alternately is that the bandwidth and the delay are positively correlated. To be specific, when the bandwidth is extremely large, the network is congested, and the delay is also extremely large. When the delay is extremely small, the network is smooth, and the bandwidth is also extremely small. The foregoing detection method can keep a value of the congestion window consistent with an actual capacity of the network. The size of the congestion window can reflect a congestion degree of the network, so that congestion optimization is performed based on the size of the congestion window. Compared with the gQUIC library, the QUIC-SDK provided in this aspect of this disclosure provides a modified detection algorithm in congestion control, so that a bandwidth of a current network returned by the QUIC-SDK can be large enough, for example, can support detection of a bandwidth of 100 MB/s.

For Pacing: Pacing refers to transmitting at a uniform speed, that is, transmitting data according to the same time interval (a Pacing interval). If a large amount of data needs to be transmitted currently, if all the data may be transmitted at a moment, a large transmission speed may be required, which may be likely to cause network congestion. In the QUIC-SDK provided in this aspect of this disclosure, for implementation of Pacing, the transmit end obtains a current bandwidth through the detection algorithm, and then allocates a transmittable data amount according to a time unit (for example, 10 ms/50 ms/100 ms), rather than using an instantaneous transmission manner. Therefore, when the current bandwidth returned by the detection algorithm may be large enough, the Pacing interval can be ignored. Therefore, in this case, when the transmit end needs to transmit the data, the data may be transmitted immediately, rather than transmitted at intervals.

Costs (machine costs and maintenance costs) added by the foregoing solutions are almost ignored. In addition, after the QUIC gets online, in an actual scenario, the connection stability of the service gateway may be improved by about 33% compared with the WebSocket, and a transmission delay of a user operation instruction may be reduced by about 13% compared with the SCTP. In a weak network environment, the QUIC has more significant experience improvement than WebSocket and SCTP.

FIG. 16 is a schematic flowchart of a data transmission method according to an exemplary aspect of this disclosure. The method may be applied to a client. As shown in FIG. 16, the method may include the following operation.

Operation 1602. Transmit a user datagram protocol (UDP) data packet to a server.

A communication connection may be established between the client and a service side running in a server, the server and the client may be integrated with a quick user datagram protocol Internet connection-software development kit (QUIC-SDK), and the QUIC-SDK may be configured to implement QUIC protocol-based transmission. For example, the UDP data packet may include an operation instruction of a user of a cloud game to operate the cloud game, or include data configured for authentication, or includes performance detection data.

The server may be configured to determine a target second thread from n second threads through a first thread, and transfer the UDP data packet to the target second thread through the first thread. The n second threads may be configured for processing the UDP data packet, the target second thread may be configured for managing a QUIC connection corresponding to the UDP data packet, the first thread and the second threads may be provided by the QUIC-SDK, and n may be an integer greater than 1.

In some aspects, during transmission of to-be-transmitted data by an application layer of the client, the to-be-transmitted data may be transmitted to a packet transmission processing component in a QUIC thread, where the QUIC thread may be provided by the QUIC-SDK. The to-be-transmitted data may be stored in a third buffer through the packet transmission processing component. The third buffer may be a local buffer of the client. Data in the third buffer may be transmitted when data sending may be performed through the packet transmission processing component. For a specific process in which the client transmits the to-be-transmitted data, reference may be made to the aspect corresponding to FIG. 7. That is, the aspect corresponding to FIG. 7 can also be performed by using the client as an execution entity. Details are not described herein in the aspects of this disclosure.

Based on the above, according to the method provided in this disclosure, the second threads may be scheduled by the first thread, and different second threads may manage different QUIC connections, so that QUIC connections are managed through different threads. Therefore, the server can fully utilize a concurrent processing capability of a plurality of cores, thereby avoiding a problem of a great limitation on a bottleneck of a concurrent amount caused when a single thread may be used to manage QUIC connections, improving the efficiency of managing QUIC connections, and helping improve the data transmission performance.

A sequence of the steps of the methods provided in the aspects of this disclosure may be properly adjusted, an operation may also be correspondingly added or omitted according to a situation, and variations readily figured out by a person skilled in the art within the technical scope disclosed in this disclosure shall fall within the protection scope of this disclosure. Therefore, details are not described again.

FIG. 17 is a schematic structural diagram of a first data transmission apparatus according to an exemplary aspect of this disclosure. A communication connection may be established between a service side running in the apparatus and a client, the service side and the client may be integrated with a quick user datagram protocol Internet connection-software development kit (QUIC-SDK), and the QUIC-SDK may be configured to implement QUIC protocol-based transmission. As shown in FIG. 17, the apparatus may include the following modules:

a receiving module 1701, configured to receive a user datagram protocol (UDP) data packet transmitted by the client;

a determining module 1702, configured to determine a target second thread from n second threads through a first thread, where the n second threads are configured for processing the UDP data packet, the target second thread may be configured for managing a QUIC connection corresponding to the UDP data packet, the first thread and the second threads are provided by the QUIC-SDK, and n may be an integer greater than 1; and a transferring module 1703, configured to transfer the UDP data packet to the target second thread through the first thread.

In an exemplary design, the determining module 1702 may be configured to:

parse the UDP data packet through the first thread in response to that the first thread receives the UDP data packet, to obtain a target connection identifier; and determine, through the first thread, the target second thread from the n second threads according to the target connection identifier.

In an exemplary design, the determining module 1702 may be configured to:

determine, through the first thread, a second thread including a session object corresponding to the target connection identifier as the target second thread according to a first buffer in a case that the QUIC connection corresponding to the target connection identifier is an existing connection, where the first buffer may be configured for storing a correspondence between session objects in different second threads and connection identifiers, and each session object corresponds to a QUIC connection.

In an exemplary design, each thread in the n second threads includes a dispatcher, and the dispatcher may be configured to manage one or more session objects; the transferring module 1703 may be configured to transfer the UDP data packet to the dispatcher in the target second thread through the first thread;

the determining module 1702 may be configured to determine the session object corresponding to the target connection identifier through the dispatcher in the target second thread; and the transferring module 1703 may be configured to transfer the UDP data packet to the session object corresponding to the target connection identifier through the dispatcher in the target second thread.

In an exemplary design, the determining module 1702 may be configured to:

determine the target second thread from the n second threads randomly through the first thread in a case that the QUIC connection corresponding to the target connection identifier is not an existing connection.

In an exemplary design, each thread in the n second threads includes a dispatcher, the dispatcher may be configured to manage one or more session objects, and each session object corresponds to a QUIC connection. As shown in FIG. 18, the apparatus may further include the following modules:

the transferring module 1703, configured to transfer the UDP data packet to the dispatcher in the target second thread through the first thread;

an establishment module 1704, configured to establish the QUIC connection of the UDP data packet in a case that the dispatcher in the target second thread determines that the QUIC connection corresponding to the target connection identifier may be not an existing connection;

the establishment module 1704, configured to create a session object corresponding to the QUIC connection of the UDP data packet in the target second thread; and the transferring module 1703, configured to transfer the UDP data packet to the session object corresponding to the QUIC connection of the UDP data packet through the dispatcher in the target second thread.

Figure 19:
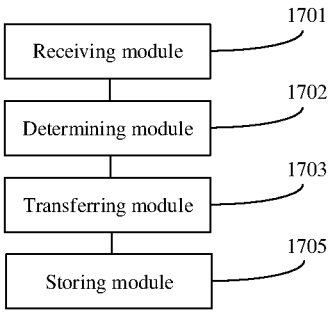
FIG. 19 is a schematic structural diagram of a third data transmission apparatus according to an illustrative aspect of this disclosure.

In an exemplary design, as shown in FIG. 19, the apparatus may further include the following module:

a storing module 1705, configured to store a correspondence between the session object in the target second thread and the target connection identifier in a first buffer.

In an exemplary design, the establishment module 1704 may be configured to:

create, based on a UDP file descriptor, the session object corresponding to the QUIC connection of the UDP data packet in the target second thread, where the UDP file descriptor may be provided with a reuse rule, and the reuse rule may be configured for the first thread and the second threads to bind the same listening address for the UDP data packet.

Figure 20:
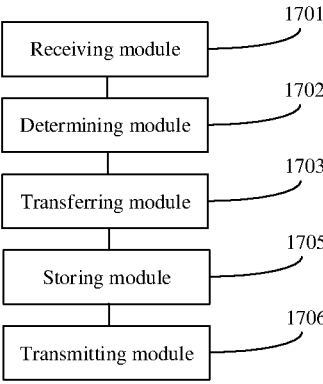
FIG. 20 is a schematic structural diagram of a fourth data transmission apparatus according to an illustrative aspect of this disclosure.

In an exemplary design, as shown in FIG. 20, the apparatus further includes the following modules:

the transferring module 1703, configured to transfer, during transmission of to-be-transmitted data by an application layer of the server, the to-be-transmitted data to a packet transmission processing component in a QUIC thread, where the QUIC thread may be provided by the QUIC-SDK;

a storing module 1705, configured to store the to-be-transmitted data in a second buffer through the packet transmission processing component, where the second buffer may be a local buffer of the server; and a transmitting module 1706, configured to transmit data in the second buffer when data sending may be performed through the packet transmission processing component.

In an exemplary design, the transmitting module 1706 may be configured to:

transmit all data in the second buffer when data sending may be performed through the packet transmission processing component.

Figure 21:
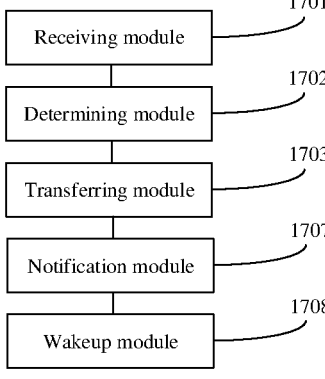
FIG. 21 is a schematic structural diagram of a fifth data transmission apparatus according to an illustrative aspect of this disclosure.

In an exemplary design, as shown in FIG. 21, the apparatus further includes the following modules:

a notification module 1707, configured to transmit a wakeup notification to a message loop based on a send event file descriptor through the packet transmission processing component, where the message loop may be configured for managing a transmission task; and a wakeup module 1708, configured to wake up the packet transmission processing component through the message loop to instruct the packet transmission processing component to perform data sending.

Figure 22:
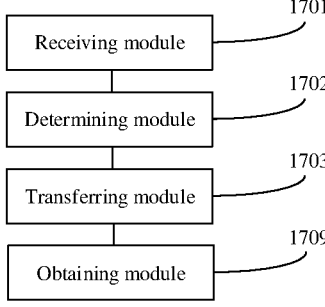
FIG. 22 is a schematic structural diagram of a sixth data transmission apparatus according to an illustrative aspect of this disclosure.

In an exemplary design, as shown in FIG. 22, the apparatus further includes the following modules:

an obtaining module 1709, configured to obtain a crash file through a cloud storage server in a case of receiving a crash signal transmitted by the client; and the determining module 1702, configured to determine a crash reason and position according to the crash file, where the crash file may be generated and uploaded to the cloud storage server by the client in a case of monitoring a running crash through the QUIC-SDK.

Figure 23:
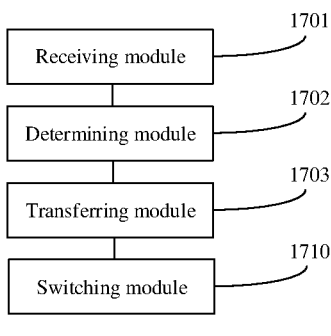
FIG. 23 is a schematic structural diagram of a seventh data transmission apparatus according to an illustrative aspect of this disclosure.

In an exemplary design, as shown in FIG. 23, the apparatus further includes the following module:

a switching module 1710, configured to switch an application layer protocol in a case of receiving the crash signal transmitted by the client.

Figure 24:
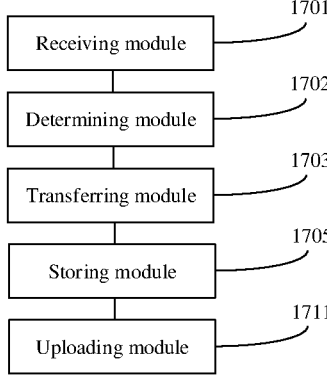
FIG. 24 is a schematic structural diagram of an eighth data transmission apparatus according to an illustrative aspect of this disclosure.

In an exemplary design, as shown in FIG. 24, the apparatus further includes the following modules:

a storing module 1705, configured to format and store performance detection data in a local file during operation of the server; and an uploading module 1711, configured to upload the local file to a cloud storage server when the server ends the service, where the local file in the cloud storage server may be parsed to obtain performance detection information, and the performance detection information may be displayed in a user interface.

Figure 25:
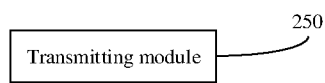
FIG. 25 is a schematic structural diagram of a ninth data transmission apparatus according to an illustrative aspect of this disclosure.

FIG. 25 may be a schematic structural diagram of another data transmission apparatus according to an exemplary aspect of this disclosure. A communication connection may be established between the apparatus and a service side running in a server, the server and the apparatus are integrated with a quick user datagram protocol Internet connection-software development kit (QUIC-SDK), and the QUIC-SDK may be configured to implement QUIC protocol-based transmission. As shown in FIG. 25, the apparatus includes the following module:

a transmitting module 2501, configured to transmit a user datagram protocol (UDP) data packet to the server, where the server may be configured to determine a target second thread from n second threads through a first thread, and transmit the UDP data packet to the target second thread through the first thread, the n second threads are configured for processing the UDP data packet, the target second thread may be configured for managing a QUIC connection corresponding to the UDP data packet, the first thread and the second threads are provided by the QUIC-SDK, and n may be an integer greater than 1.

Figure 26:
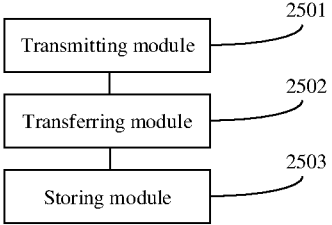
FIG. 26 is a schematic structural diagram of a tenth data transmission apparatus according to an illustrative aspect of this disclosure.

In an exemplary design, as shown in FIG. 26, the apparatus further includes the following modules:

a transferring module 2502, configured to transfer, during transmission of to-be-transmitted data by an application layer of the client, the to-be-transmitted data to a packet transmission processing component in a QUIC thread, where the QUIC thread may be provided by the QUIC-SDK;

a storing module 2503, configured to store the to-be-transmitted data in a third buffer through the packet transmission processing component, where the third buffer may be a local buffer of the client; and the transmitting module 2501, configured to transmit data in the third buffer when data sending may be performed through the packet transmission processing component.

An aspect of this disclosure further provides a computer device, including a processor and a memory, the memory having at least one instruction stored therein, at least one program, and a code set or an instruction set, and the at least one instruction, the at least one program, and the code set or the instruction set being loaded and executed by the processor to implement the data transmission method according to the foregoing method aspects.

Figure 27:
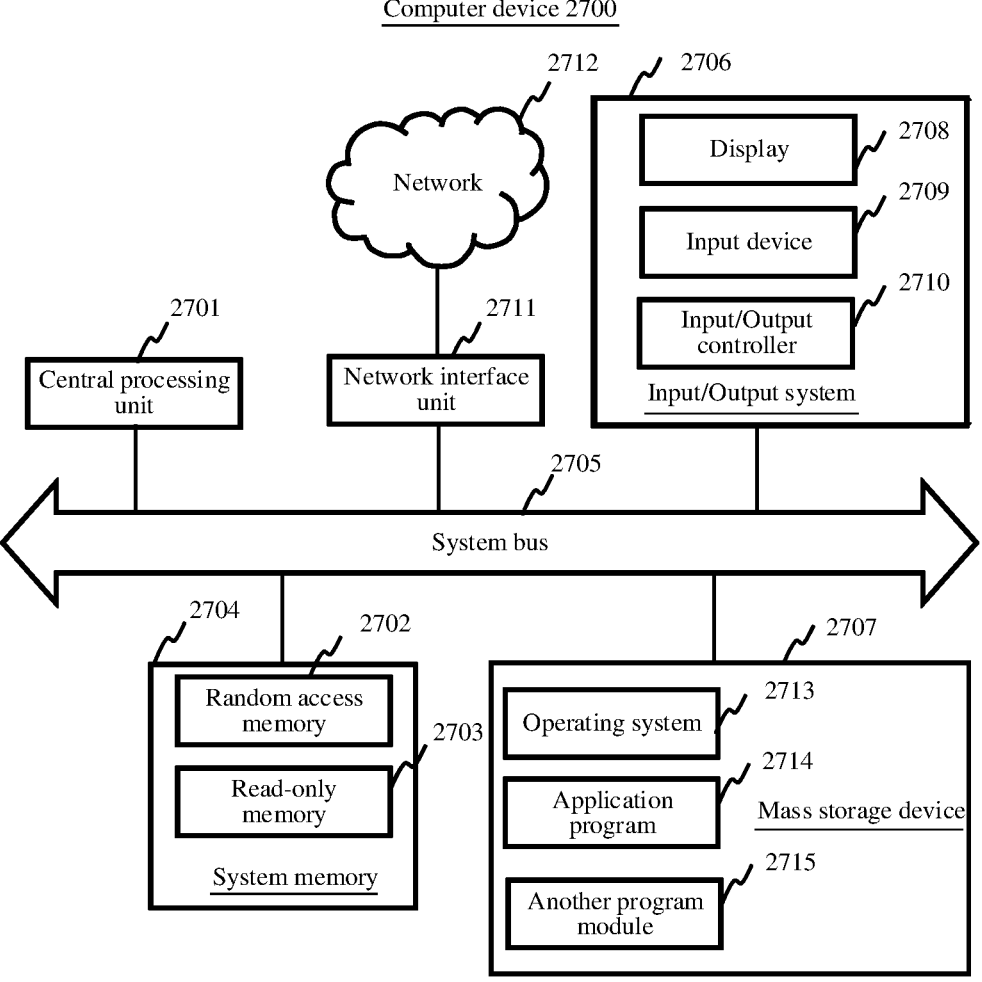
FIG. 27 is a schematic structural diagram of a computer device according to an illustrative aspect of this disclosure.

For example, FIG. 27 is a schematic structural diagram of a computer device according to an exemplary aspect of this disclosure.

The computer device 2700 may include a central processing unit (CPU) 2701, a system memory 2704 including a random-access memory (RAM) 2702 and a read-only memory (ROM) 2703, and a system bus 2705 connecting the system memory 2704 and the CPU 2701. The computer device 2700 may further include a basic input/output system (I/O system) 2706 configured to transmit information between components in the computer device, and a mass storage device 2707 configured to store an operating system 2713, an application program 2714, and another program module 2715.

The basic input/output system 2706 may include a display 2708 configured to display information and an input device 2709 such as a mouse or a keyboard that may be configured to input information by a user. The display 2708 and the input device 2709 may be both connected to the CPU 2701 by using an input/output controller 2710 connected to the system bus 2705. The basic input/output system 2706 may further include the input/output controller 2710, for receiving and processing an input from multiple other devices such as a keyboard, a mouse, or an electronic stylus. Similarly, the input/output controller 2710 may further provide an output to a display screen, a printer, or another type of output device.

The mass storage device 2707 may be connected to the CPU 2701 by using a mass storage controller (not shown) connected to the system bus 2705. The mass storage device 2707 and an associated computer-readable storage medium may provide non-volatile storage for the computer device 2700. That is, the mass storage device 2707 may include a computer-readable storage medium (not shown) such as a hard disk or a compact disc ROM (CD-ROM) drive.

In general, the computer-readable storage medium may include a computer storage medium and a communications medium. The computer storage medium may include volatile and non-volatile, removable and non-removable media that store information such as computer-readable storage instructions, data structures, program modules, or other data and that are implemented by using any method or technology. The computer storage medium may include a RAM, a ROM, an erasable programmable read-only memory (EPROM), an electrically-erasable programmable read-only memory (EEPROM), a flash memory or another solid-state storage device, a CD-ROM, a digital versatile disc (DVD) or another optical storage, a cassette, a magnetic tape, magnetic disk storage or another magnetic storage device, or the like. Certainly, a person skilled in art can know that the computer storage medium is not limited to the foregoing several types. The system memory 2704 and the mass storage device 2707 may be collectively referred to as a memory.

The memory stores one or more programs, where the one or more programs may be configured to be executed by one or more CPUs 2701, the one or more programs may include instructions for implementing the foregoing method aspects, and the one or more CPUs 2701 may be configured to execute the one or more programs to implement the methods provided in the foregoing method aspects.

According to the aspects of this disclosure, the computer device 2700 may further be connected, through a network such as the Internet, to a remote computer device on the network and run. That is, the computer device 2700 may be connected to a network 2712 by using a network interface unit 2711 connected to the system bus 2705, or may be connected to another type of network or a remote computer device system (not shown) by using the network interface unit 2711.

The memory further may include one or more programs, where the one or more programs are stored in the memory and include steps that are configured for performing the method provided in the aspects of this disclosure and that are performed by a computer device.

An aspect of this disclosure further may provide a computer-readable storage medium. The readable storage medium may store at least one instruction, at least one program, and a code set or an instruction set, and the at least one instruction, the at least one program, and the code set or the instruction set may be loaded and executed by a processor of the computer device to implement the data transmission method according to the foregoing method aspects.

This disclosure further may provide a computer program product or a computer program, where the computer program product or the computer program includes computer instructions, and the computer instructions are stored in a computer-readable storage medium. A processor of a computer device may read the computer instructions from the computer-readable storage medium and executes the computer instructions, to cause the computer device to perform the data transmission method provided in the foregoing method aspects.

What is claimed is:

1. A data transmission method, comprising:
 receiving, by a server hosting a cloud game, from a client device accessing the cloud game, and via a communication connection, a first user datagram protocol (UDP) data packet, wherein the communication connection is established:
   based on Quick UDP Internet Connection (QUIC) protocols; and
   between a first QUIC-Software Development Kit (QUIC-SDK) present at the server and a second QUIC-SDK present at the client device;
 selecting, by a first thread of a plurality of threads provided by the first QUIC-SDK at the server, a second thread from the plurality of threads, wherein:
   the second thread has a dispatcher managing one or more session objects;
   each session object of the one or more session objects manages a QUIC connection; and
   a first session object of the one or more session objects has a connection identifier which corresponds to a target connection identifier of the first UDP data packet;
 transferring, by the first thread to the second thread and by the second thread to the first session object, the first UDP data packet;
 managing, by the first session object of the second thread, a QUIC connection associated with the first UDP data packet; and
 wherein the first UDP data packet comprises an operation instruction for the cloud game hosted on the server.

2. The data transmission method of claim 1, wherein selecting the second thread comprises:
 parsing, by the first thread and based on receiving the UDP packet, the first UDP data packet to obtain the target connection identifier identifying the QUIC connection; and
 determining, by the first thread and based on the target connection identifier, the second thread from the plurality of threads.

3. The data transmission method of claim 2, wherein selecting the second thread further comprises:
 maintaining, by the first thread in a first buffer, information associated with:
   the first session object of the second thread; and
   the connection identifier of the QUIC connection managed by the first session object; and
 determining, by the first thread and based on the information stored in the first buffer, that the target connection identifier of the first UDP data packet corresponds to the connection identifier of the QUIC connection managed by the first session object.

4. The data transmission method of claim 1, wherein the server receives a second UDP data packet, further comprising:
 determining, based on the target connection identifier of the second UDP data packet, that a QUIC connection associated with the second UDP data packet does not exist.

5. The data transmission method of claim 4, further comprising:
 transferring, by the first thread, the second UDP data packet to the dispatcher of the second thread;
 establishing, by the dispatcher, a second QUIC connection associated with the second UDP packet;
 creating, by the dispatcher, a second session object corresponding to the second QUIC connection; and
 transferring, by the dispatcher, the second UDP data packet to the second session object.

6. The data transmission method of claim 5, further comprising:
 storing a correspondence between the second session object in the second thread and the target connection identifier in a first buffer.

7. The data transmission method of claim 5, wherein creating the second session object corresponding to the second QUIC connection comprises:
 creating, based on a UDP file descriptor of the second UDP packet, the second session object, wherein the UDP file descriptor comprises a reuse rule, and wherein the reuse rule is configured for the first thread and the second thread to bind a same listening address for the second UDP data packet.

8. The data transmission method of claim 1, further comprising sending, to the client device, to-be-transmitted data, wherein the sending the to-be-transmitted data comprises:

transferring the to-be-transmitted data to a packet transmission processing component of a third thread of the plurality of threads;

storing, by the packet transmission processing component, the to-be-transmitted data in a local buffer of the server; and sending, by the packet transmission processing component, the to-be-transmitted data from the local buffer.

9. The data transmission method of claim 8, further comprising:

transmitting, by the packet transmission processing component and based on a send event file descriptor, a wakeup notification to a message loop, wherein the message loop is configured for managing a transmission task of sending the to-be-transmitted data.

10. The data transmission method of claim 1, further comprising:

obtaining, based on receiving a crash signal from the client device, a crash file from a cloud storage server; and determining, from the crash file, a crash reason and a crash position, wherein the crash file is generated and uploaded to the cloud storage server after a running crash is detected at the client device.

11. A data transmission apparatus, comprising:

a processor; and memory storing computer-readable instructions that, when executed, cause the data transmission apparatus to:

receive, by the data transmission apparatus hosting a cloud game, from a client device accessing the cloud game, and via a communication connection, a first user datagram protocol (UDP) data packet, wherein the communication connection is established:

based on Quick UDP Internet Connection (QUIC) protocols; and between a first QUIC-Software Development Kit (QUIC-SDK) present at the data transmission apparatus and a second QUIC-SDK present at the client device;

select, by a first thread of a plurality of threads provided by the first QUIC-SDK at the data transmission apparatus, a second thread from the plurality of threads, wherein the second thread has a dispatcher managing one or more session objects;

each session object of the one or more session objects manages a QUIC connection; and a first session object of the one or more session objects has a connection identifier which corresponds to a target connection identifier of the first UDP data packet;

transfer, by the first thread to the second thread and by the second thread to the first session object, the first UDP data packet;

manage, by the first session object of the second thread, a QUIC connection associated with the first UDP data packet; and wherein the first UDP data packet comprises an operation instruction for the cloud game hosted on the data transmission apparatus.

12. The data transmission apparatus of claim 11, wherein the computer-readable instructions, when executed, cause the data transmission apparatus to select the second thread by:

parsing, by the first thread and based on receiving the UDP packet, the first UDP data packet to obtain the target connection identifier identifying the QUIC connection; and determining, by the first thread based on the target connection identifier, the second thread from the plurality of threads.

13. The data transmission apparatus of claim 12, wherein the computer-readable instructions, when executed, cause the data transmission apparatus to select the second thread further by:

maintaining, by the first thread in a first buffer, information associated with:

the first session object of the second thread; and the connection identifier of the QUIC connection managed by the first session object; and determining, by the first thread and based on the information stored in the first buffer, that the target connection identifier of the first UDP data packet corresponds to the connection identifier of the QUIC connection managed by the first session object.

14. A non-transitory computer-readable storage medium, storing computer readable instructions that, when executed by a processor, cause a data processing system to perform:

receiving, by the data processing system hosting a cloud game, from a client device accessing the cloud game, and via a communication connection, a first user datagram protocol (UDP) data packet, wherein the communication connection is established:

based on Quick UDP Internet Connection (QUIC) protocols; and between a first QUIC-Software Development Kit (QUIC-SDK) present at the data processing system and a second QUIC-SDK present at the client device;

selecting, by a first thread of a plurality of threads provided by the first QUIC-SDK at the data processing system, a second thread from the plurality of threads, wherein:

the second thread has a dispatcher managing one or more session objects;

each session object of the one or more session objects manages a QUIC connection; and a first session object of the one or more session objects has a connection identifier which corresponds to a target connection identifier of the first UDP data packet;

transferring, by the first thread to the second thread and by the second thread to the first session object, the first UDP data packet;

managing, by the first session object of the second thread, a QUIC connection associated with the first UDP data packet; and wherein the first UDP data packet comprises an operation instruction for the cloud game hosted on the data processing system.

15. The non-transitory computer-readable storage medium of claim 14, wherein the computer readable instructions that, when executed by the processor, further cause the data processing system to perform selecting the second thread by:

parsing, by the first thread and based on receiving the first UDP packet, the first UDP data packet to obtain the target connection identifier identifying the QUIC connection; and determining, based on the target connection identifier, the second thread from the plurality of threads.

16. The non-transitory computer-readable storage medium of claim 15, wherein the computer readable instructions that, when executed by the processor, further cause the data processing system to perform selecting the second thread by:

maintaining, by the first thread in a first buffer, information associated with:

the first session object of the second thread; and the connection identifier of the QUIC connection managed by the first session object; and determining, by the first thread and based on the information stored in the first buffer, that the target connection identifier of the first UDP data packet corresponds to the connection identifier of the QUIC connection managed by the first session object.

17. The data transmission apparatus of claim 11, wherein the computer-readable instructions, when executed, further cause the data transmission apparatus to:

receive a second UDP data packet; and determine, based on the target connection identifier of the second UDP data packet, that a QUIC connection associated with the second UDP data packet does not exist.

18. The data transmission apparatus of claim 17, wherein the computer-readable instructions, when executed, further cause the data transmission apparatus to:

transfer, by the first thread, the second UDP data packet to the dispatcher of the second thread;

establish, by the dispatcher, a second QUIC connection associated with the second UDP data packet;

create, by the dispatcher, a second session object corresponding to the second QUIC connection; and transfer, by the dispatcher, the second UDP data packet to the second session object.

19. The non-transitory computer-readable storage medium of claim 14, wherein the computer readable instructions that, when executed by the processor, further cause the data processing system to perform:

receiving a second UDP data packet; and determining, based on the target connection identifier of the second UDP data packet, that a QUIC connection associated with the second UDP data packet does not exist.

20. The non-transitory computer-readable storage medium of claim 19, wherein the computer readable instructions that, when executed by the processor, further cause the data processing system to perform:

transferring, by the first thread, the second UDP data packet to the dispatcher of the second thread;

establishing, by the dispatcher, a second QUIC connection associated with the second UDP data packet;

creating, by the dispatcher, a second session object corresponding to the second QUIC connection; and transferring, by the dispatcher, the second UDP data packet to the second session object.

* * * * *